US012468967B2

(12) United States Patent
Zimmer

(10) Patent No.: US 12,468,967 B2
(45) Date of Patent: Nov. 11, 2025

(54) METHOD AND SYSTEM FOR GENERATING A SOCIO-TECHNICAL DECISION IN RESPONSE TO AN EVENT

(71) Applicant: The Boeing Company, Chicago, IL (US)

(72) Inventor: Nico Zimmer, Hessen (DE)

(73) Assignee: The Boeing Company, Chicago, IL (US)

( * ) Notice: Subject to any disclaimer, the term of this patent is extended or adjusted under 35 U.S.C. 154(b) by 1004 days.

(21) Appl. No.: 17/517,698

(22) Filed: Nov. 3, 2021

(65) Prior Publication Data

US 2022/0156613 A1 May 19, 2022

Related U.S. Application Data

(60) Provisional application No. 63/113,419, filed on Nov. 13, 2020.

(51) Int. Cl.
*G06N 5/043* (2023.01)

(52) U.S. Cl.
CPC .................................... *G06N 5/043* (2013.01)

(58) Field of Classification Search
CPC .......... G06N 5/043; G06N 7/01; G06Q 50/40; G06Q 10/063; G08G 5/0039; G08G 5/0043
See application file for complete search history.

(56) References Cited

U.S. PATENT DOCUMENTS

| | | | | |
|---|---|---|---|---|
| 8,831,864 | B1 * | 9/2014 | Chen | G08G 5/0043 701/118 |
| 9,153,138 | B1 * | 10/2015 | Jewett | G08G 5/0013 |
| 2017/0185082 | A1 * | 6/2017 | Matos | A61N 1/37247 |
| 2018/0308022 | A1 * | 10/2018 | Philips | G06N 20/00 |

OTHER PUBLICATIONS

Castro, A.J.M. et al., "A New Approach for Disruption Management in Airline Operations Control", 2014, Springer-Verlag Berlin Heidelberg, Studies in Computational Intelligence (vol. 562) (Year: 2014).*

(Continued)

*Primary Examiner* — Jennifer N Welch
*Assistant Examiner* — Vijay M Balakrishnan
(74) *Attorney, Agent, or Firm* — Yee & Associates, P.C.

(57) ABSTRACT

A method includes receiving, by a processing circuit, a plurality of solutions to avoid or decrease an adverse effect caused by an event. The method also includes selecting, by the processing circuit, a selected solution from the plurality of solutions by performing a socio-technical decision process. The socio-technical decision process includes simulating a human decision using a behavior model and a goal model for each of a plurality of agents and simulating a system decision using a sequential error search method for each of a plurality of systems. The socio-technical decision process also includes generating a socio-technical decision using the human decisions and the system decisions. The socio-technical decision corresponds to the selected solution. The method further includes facilitating a performance of one or more actions to implement the socio-technical decision.

19 Claims, 10 Drawing Sheets

(56) References Cited

OTHER PUBLICATIONS

Mariani, C., "Disruption management in the airline industry", 2015, Norwegian University of Science and Technology (Year: 2015).*
Wojcik, "Airline Personalities and Air Traffic Flow Management: A Simple Agent-Based Model", 2004, AIAA 4th Aviation Technology , Integration and Operations (ATIO) Forum (Year: 2004).*
Chien et al., "Relation between Trust Attitudes Toward Automation, Hofstede's Cultural Dimensions, and Big Five Personality Traits", 2016, Proceedings of the Human Factors and Ergonomics Society Annual Meeting, pp. 841-845 (Year: 2016).*
Lind, Uku-Rasmus, "Agent-Based Modelling and Simulation of Personalities Based on the Five Factor Personality Model", TalTech Library Digital Collection, https://digikogu.taltech.ee/et/Item/2d47bc3f-759e-4c87-84f6-a1648d7fcd63, archived Jan. 1, 2021 at the Wayback Machine (Year: 2021).*
Kohl et al., "Airline disruption management—Perspectives, experiences and outlook", 2007, Journal of Air Transport Management, pp. 149-162 (Year: 2007).*
Makhlouf et al., "Real-Time Management System for Airline Operations", Mar. 2011, International Review on Computers and Software, vol. 6, No. 2 (Year: 2011).*
Ahrnadt, S. et al., "Modelling of Personality in Agents: From Psychology to Implementation," 4th International Workshop on Human-Agent Interaction Design and Models, 2015, 16 pages.
Bouarfa, S. et al., "Agent-Based Modeling and Simulation of Coordination by Airline Operations Control," IEEE Transactions on Emerging Topics in Computing 4.1, Mar. 2016, pp. 9-20.
Castro, A.J.M. et al., "A Multi-Agent System for Airline Operations Control," 7th International Conference on Practical Applications of Agents and Multi-Agent Systems (PAAMS 2009), Edited by Y. Demazeau et al., Berlin, Heidelberg: Springer, pp. 159-168.
Doce, T. et al., "Creating individual agents through personality traits," Lecture Notes in Computer Science (including subseries Lecture Notes in Artificial Intelligence and Lecture Notes in Bioinformatics), 6356 LNAI.28, 2010, 257-264.
McCrae, R.R et al., "Brief Versions of the NEO-PI-3," Journal of Individual Differences 28.3, 2007, pp. 116-128.

* cited by examiner

800

| AGENT (102) | FUNCTIONAL GOAL (DESIRE) (802) | QUALITY GOAL (804) | PLAN ASSESSMENT (BELIEF) | SOLUTION (PLANS) (602) | | |
|---|---|---|---|---|---|---|
| | | | | CANCEL (603) | DELAY (604) | REROUTE (605) |
| CREW CONTROL 118 | CHOOSE CREW OPTION (AVOID EXTRA DUTY) 712 | PROTECTED CREW 706b | PROBABILITY(P) 810 | LOW | HIGH | HIGH (806) |
| | | | #STEPS(P) 808 | LOW | HIGH | MED |
| PASSENGER CONTROL 120 | CHOOSE PASSENGER OPTION (AVOID CANCELING) 710 | PROTECTED PASSENGERS 704b | PROBABILITY(P) 810 | LOW | HIGH | HIGH (806) |
| | | | #STEPS(P) 808 | HIGH | LOW | MED |
| FLIGHT OPERATIONS 202 | CHOOSE AIRCRAFT OPTION & MAXIMIZED REVENUE 714 | PROTECTED SCHEDULE 708a | PROBABILITY(P) 810 | LOW | HIGH | MED (806) |
| | | | #STEPS(P) 808 | LOW | MED | HIGH |

*FIG. 8*

900a

| SOLUTION (602) | PROBABILITY (P) (904) | COST (C) (902) | QUOTIENT (P/C) (906) |
|---|---|---|---|
| CANCEL (603) | 0.1 | 6 | 0.017 |
| DELAY (604) | 0.6 | 5 | 0.12 |
| REROUTE (605) | 0.3 | 4 | 0.075 |

FIG. 9A

900b

| SOLUTION (602) | QUOTIENT (P/C) (906) | COST (C) (902) | REMAINING COSTS (E(Tau) (908) |
|---|---|---|---|
| DELAY (603) | 0.12 | 5 | 0.6 |
| REROUTE (604) | 0.075 | 4 | 0.864 |
| CANCEL (605) | 0.017 | 6 | 0.9565 |

FIG. 9B

METHOD AND SYSTEM FOR GENERATING A SOCIO-TECHNICAL DECISION IN RESPONSE TO AN EVENT

CROSS-REFERENCE TO RELATED APPLICATIONS

The present application claims benefit of priority to U.S. Provisional Patent Application No. 63/113,419 filed Nov. 13, 2020.

FIELD

The subject disclosure relates to efficient operations control, and more particularly to a method and system for generating a socio-technical decision in response to an event that causes irregular operation in an operations control center, such as an airline operations control center.

BACKGROUND

Operations control centers are used to manage a fleet of vehicles, such as a fleet of airplanes, personnel that operate the vehicles, passengers that travel on the vehicles, and other entities that may be associated with a transportation operation or similar business. When a disruptive event occurs, one or more solutions or courses of action may be implemented. The solution or course of action is often implemented with minimal consideration or no consideration of the impact on agents and systems associated with the operations control center.

SUMMARY

In accordance with an example, a method includes receiving, by a processing circuit, a plurality of solutions to avoid or decrease an adverse effect caused by an event. The method also includes selecting, by the processing circuit, a selected solution from the plurality of solutions by performing a socio-technical decision process. The socio-technical decision process includes simulating a human decision process using a behavior model and a goal model for each of a plurality of agents to select an agent solution from the plurality of solutions for each agent. The socio-technical decision process additionally includes simulating a system decision process using a sequential error search method for each of a plurality of systems to select a system solution from the plurality of solutions for each system and generating a socio-technical decision using the selected agent solutions and the selected system solutions. The socio-technical decision corresponds to the selected solution. The method further includes performing one or more actions to implement the socio-technical decision.

In accordance with another example, a system includes a processing circuit and a memory associated with the processing circuit. The memory incudes computer-readable program instructions that, when executed by the processing circuit causes the processing circuit to perform a set of functions. The set of functions include receiving a plurality of solutions to avoid or decrease an adverse effect caused by an event and selecting a selected solution from the plurality of solutions by performing a socio-technical decision process. The socio-technical decision process includes receiving a plurality of solutions to avoid or decrease an adverse effect caused by an event and selecting a selected solution from the plurality of solutions by performing a socio-technical decision process. The socio-technical decision process includes simulating a human decision process using a behavior model and a goal model for each of a plurality of agents to select an agent solution from the plurality of solutions for each agent. The socio-technical decision process also includes simulating a system decision process using a sequential error search method for each of a plurality of systems to select a system solution from the plurality of solutions for each system. The socio-technical decision process also includes generating a socio-technical decision using the selected agent solutions and the selected system solutions. The socio-technical decision corresponds to the selected solution. The set of functions additionally include performing one or more actions to implement the socio-technical decision.

In accordance with another example, an airline operations control center includes a system for generating a socio-technical decision in response to an event that causes irregular operation of the airline operations control center. The system includes a processing circuit and a memory associated with the processing circuit. The memory includes computer-readable program instructions that, when executed by the processing circuit causes the processing circuit to perform a set of functions. The set of functions include receiving a plurality of solutions to avoid or decrease an adverse effect caused by an event and selecting a selected solution from the plurality of solutions by performing a socio-technical decision process. The socio-technical decision process includes simulating a human decision process using a behavior model and a goal model for each of a plurality of agents to select an agent solution from the plurality of solutions for each agent. The socio-technical decision process also includes simulating a system decision process using a sequential error search method for each of a plurality of systems to select a system solution from the plurality of solutions for each system. The socio-technical decision process additionally includes generating a socio-technical decision using the selected agent solutions and the selected system solutions. The socio-technical decision corresponds to the selected solution. The set of functions additionally include performing one or more actions to implement the socio-technical decision.

The features, functions, and advantages that have been discussed can be achieved independently in various examples or may be combined in yet other examples further details of which can be seen with reference to the following description and drawings.

BRIEF DESCRIPTION OF THE DRAWINGS

FIG. 8 is an example of a table illustrating determining an agent cost solution using an agent cost function associated with each agent in accordance with an example of the subject disclosure.

FIGS. 9A and 9B are tables illustrating determining a system cost solution using a system cost function associated with each system in accordance with an example of the subject disclosure.

DETAILED DESCRIPTION

Figure 1:
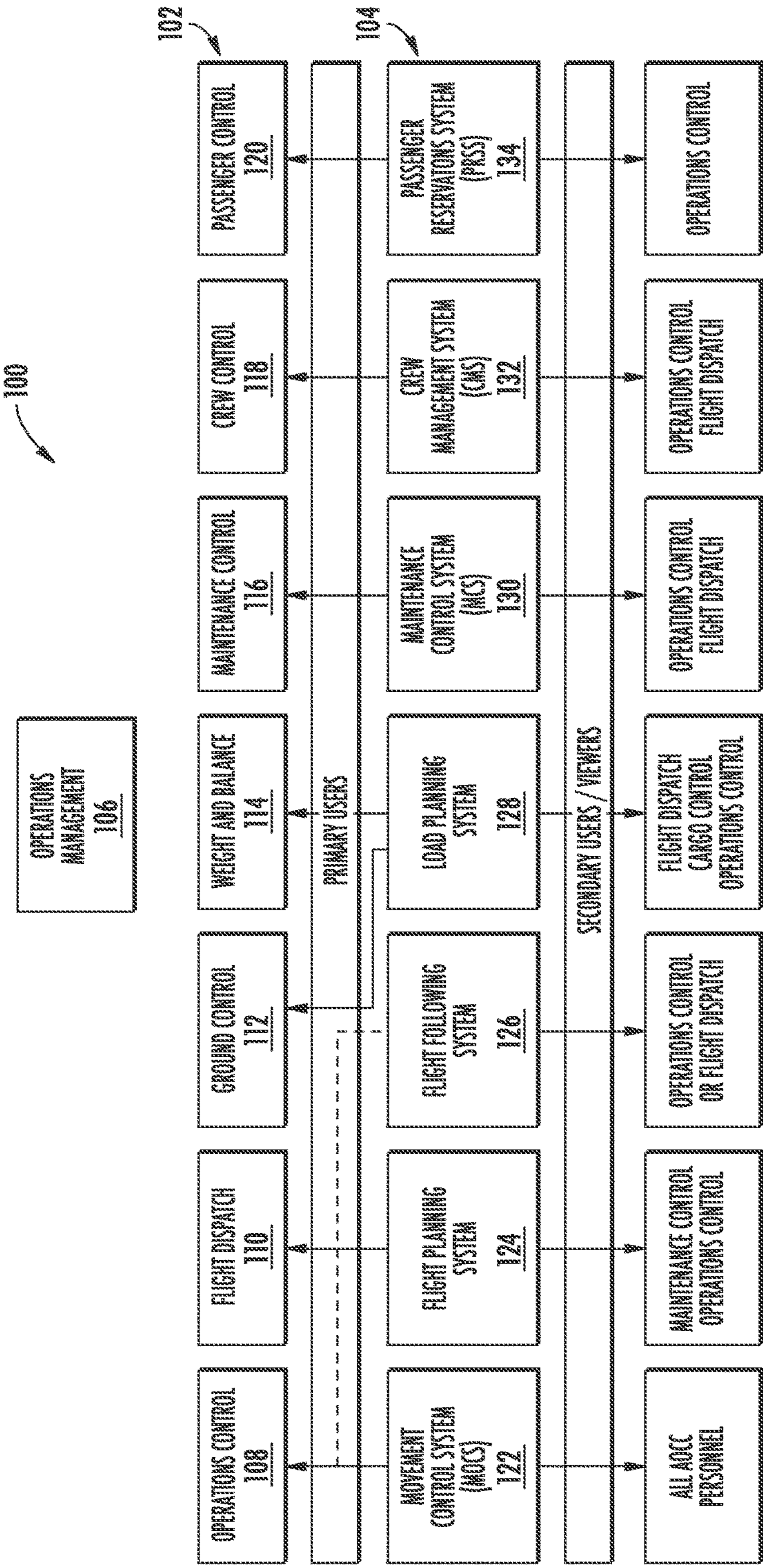
FIG. 1 is a block diagram of an example of the typical users and their associated systems that define an airline operations control center in accordance with an example of the subject disclosure.

The following detailed description of examples refers to the accompanying drawings, which illustrate specific examples of the disclosure. Other examples having different structures and operations do not depart from the scope of the subject disclosure. Like reference numerals may refer to the same element or component in the different drawings.

The subject disclosure can be a system, a method, and/or a computer program product. The computer program product can include a computer-readable storage medium (or media) having computer-readable program instructions thereon for causing a processing circuit to carry out aspects of the subject disclosure.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the subject disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the subject disclosure.

Aspects of the subject disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer-readable program instructions.

These computer-readable program instructions can be provided to a processing circuit of a general purpose computer, special purpose computer, or other programmable data processing apparatus to produce a machine, such that the instructions, which execute via the processing circuit of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The examples described herein model and simulate complex socio-technical decision processes that are being made in an operations control center, e.g., an Airline Operations Control Center (AOCC). As described in more detail herein a socio-technical decision or decision process is a decision or decision process that makes use of a human behavior goal model in combination with a search method model for a technical system decision. The examples access the impact of socio and technical change or decision to the overall system and the related operational effectiveness of an operations control center, especially during irregular operations. The exemplary method and system provide a multi-agent based approach to simulate human and technical system decisions which are based on a behavior goal model for a human's decision and a technical search method model for the technical system decision for each of a plurality of systems. In some examples, the behavior goal model and the technical search method model are replaced or integrated with a real system. The simulation results are used to interpret change or decisions to the overall system. The knowledge from the simulation results are used to design greater system acceptance for humans as well as predict operational efficiency.

In accordance with some examples, the system and method for generating a socio-technical decision include receiving, by a processing circuit, a plurality of solutions to avoid or decrease an adverse effect caused by an event. The system and method additionally include selecting, by the processing circuit, a selected solution from the plurality of solutions by performing a socio-technical decision process. The socio-technical decision process includes simulating a human decision using a behavior goal model for each of a plurality of agents. The socio-technical decision process also includes simulating a system decision using a sequential error search method for each of a plurality of systems. The socio-technical decision process further includes generating a socio-technical decision using the human decisions and the system decisions, wherein the socio-technical decision corresponds to the selected solution. The method and system additionally include facilitating a performance one or more actions to implement the socio-technical decision. In an example where the operations control center is an airline operations control center, examples of the one or more actions include but are not necessarily limited to delaying a flight of the aircraft, rerouting the flight of the aircraft, canceling the flight of the aircraft, using another aircraft, using another crew, booking passengers on another flight, etc.

Operations control centers, such as airline operations control centers, currently do not have an efficient and accurate mechanism to simulate the complex decision process that includes multiple human behavioral inputs and inputs from technical systems and to assess the impact of complex decisions on agents and systems associated with the operations control center particularly during irregular operations. The exemplary method and system described herein provide a technical solution by simulating a human decision process using a behavior model and a goal model for each of a plurality of agents to select an agent solution from a plurality of solutions for each agent and simulating a system decision process using a sequential error search method for each of a plurality of systems to select a system solution from the plurality of solutions for each system. A socio-technical decision is efficiently and accurately generated using the selected agent solution and the selected system solution, wherein the socio-technical decision corresponds to the selected solution. The socio-technical decision is implemented by facilitating a performance of one or more actions.

FIG. 1 is a block diagram of an example of the typical users and their associated systems that define an airline operations control center (AOCC) 100 in accordance with an example of the subject disclosure. While examples of the subject disclosure are described using an airline operations control center as an example, those skilled in the art will recognize that the features and functions described are applicable to other operations or entities.

Figure 2:
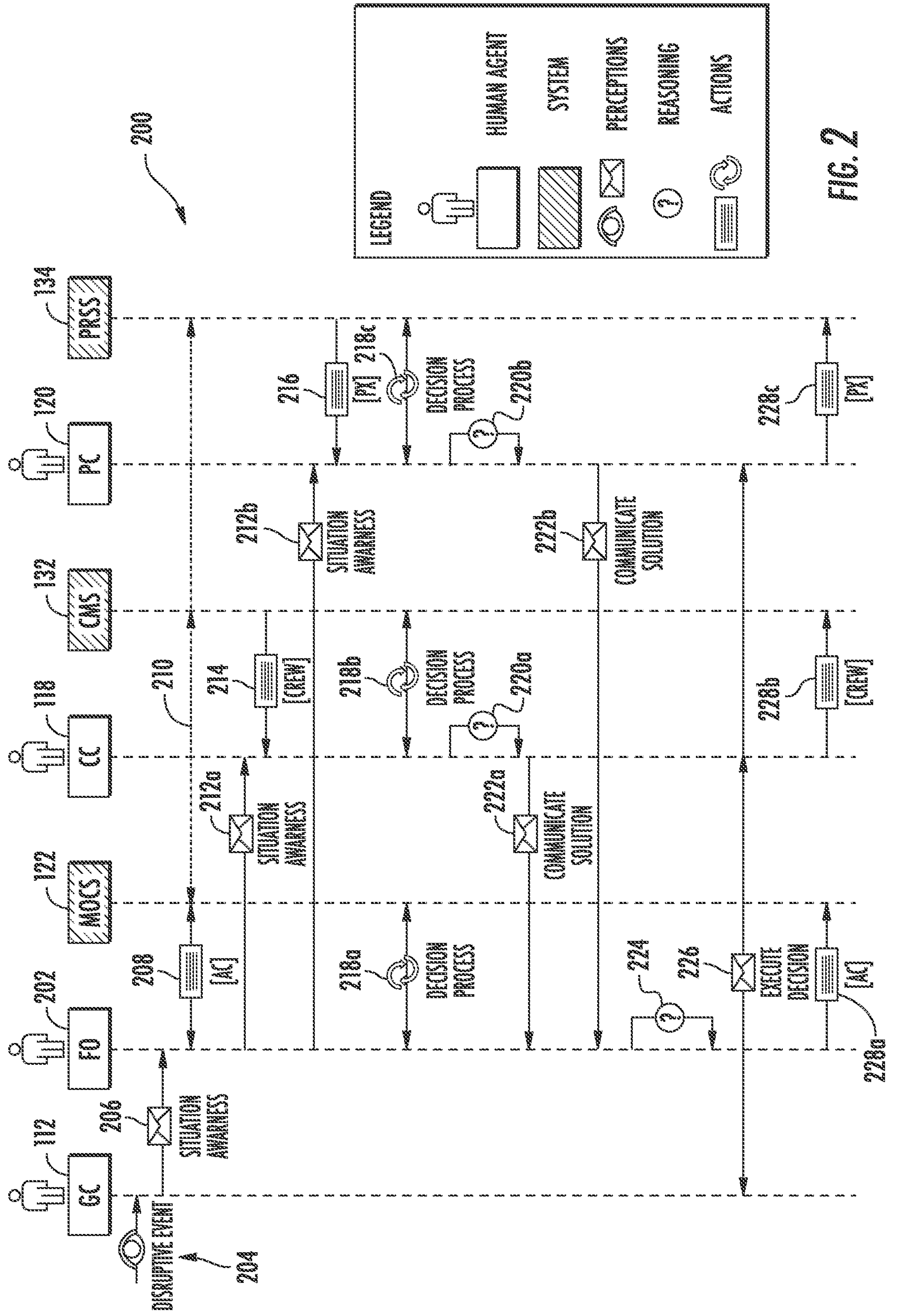
FIG. 2 is an example of an interaction model illustrating interactions between agents and technical systems of a portion of an airline operations control center in accordance with an example of the subject disclosure.

The AOCC 100 includes a plurality of different agents 102 and a plurality of different systems 104. Examples of the different agents 102 include but are not necessarily limited to an operations management agent 106, an operations control agent 108, a flight dispatch agent 110, a ground control agent 112, an operations control or flight dispatch agent 113, a weight and balance agent 114, a maintenance control agent 116, a crew control agent 118, and a passenger control agent 120. Examples of the different systems 104 include but are not necessarily limited to a movement control system (MOCS) 122, a flight planning system 124, a flight following system 126, a load planning system 128, a maintenance control system (MCS) 130, a crew management system (CMS) 132, and a passenger reservations system (PRSS) 134. In accordance with some examples and as illustrated in the exemplary AOCC 100 in FIG. 1, a particular agent 102 is associated with a particular system 104 or the particular agent 102 is the primary user of the particular system 104. For example, the operations control agent 108 is the primary user of the movement control system (MOCS) 122. The flight dispatch agent 110 is the primary user of the flight planning system 124. Either the operations control agent 108 or the flight dispatch agent 110 is the primary user of the flight following system 126, and so forth as illustrated in FIG. 2.

In accordance with some examples and as illustrated in the exemplary AOCC 100 in FIG. 1, each of the systems 104 can have a secondary user or viewer. For example, all AOCC agents or personnel view or access the movement control system 122. The maintenance control agent 116 and the operations control agent 108 view or access the flight planning system 124. An example of a system that is used for at least some of the systems 104 is described with reference to FIG. 10.

Examples of the role or responsibilities of each of the agents 102 are now described. The operations management agent 106 is typically the head of the AOCC 100 and is directly accountable for all day of operation activities. The operations control agent 108 is the central role in the AOCC 100 that coordinates in disruptive situations to resolve irregularities or reduces the outcome. The operations control agent 108 continuously monitors, analyzes, and evaluates all scheduled operations and manages the resource aircraft during disruptions by swapping aircraft, rerouting, delaying, canceling, or joining flights in conjunction with the other relevant roles such as ground control 112, maintenance control 116, crew control 118, and flight dispatch 110.

The flight dispatch agent 110 is responsible for a safe, efficient, legal, and comfortable Operational Flight Plan (OFP) calculation for each airline route. A flight plan preparation also includes all operational relevant and legally required information, e.g., weather, Notices to Airmen (NOTAMs), airspace restrictions or airport specifics to flight crews. Besides preparing the flight plan, the flight dispatch agent 110 takes care of administrative duties such as requesting a flight slot from air traffic control (ATC) and/or filing the ATC flight plan.

The ground control agent 112 is responsible for all ground handling and turnaround operations below the wing such as catering, cleaning, fueling, loading, gate, and/or ramp activities in conjunction with the airport ground handling companies and the airport itself.

The weight and balance agent 114 which is also referred to as Load Planning and Control, is responsible for developing load plans for each flight depending on the number of passengers, bags, freight and/or fuel. The payload during the weight and balance process is modified, e.g., optimized to reach the best center of gravity (CG) for the aircraft, balancing the fuel consumption.

The maintenance control agent 116 coordinates unplanned maintenance service and short-term maintenance schedules between the operations control agent 108, the operations management agent 106 and the Maintenance Control Center (MCC). The MCC (not shown in FIG. 1) is the nerve center of the airline's line maintenance, which is responsible for the airline's regular fleet maintenance.

The crew control agent 118 schedules and tracks the flight crews (cockpit and cabin) and works in close conjunction with the crew rostering department to ensure a legal (duty times and flight hours) and sound (airline policies) crew roster for each flight. Crew control monitors sign-in and check-out as well as any other update or change to the crew roster and takes care of it during disruptions by using reserve or standby crew and swapping or replacing crew members. To operate effectively, crew control needs to coordinate with operations control and flight dispatch.

The passenger control agent 120 in conjunction with the airport passenger services is responsible for operations above the wing of the aircraft. The passenger control agent 120 monitors check-in and gate entities and minimizes the disruptions on the passengers by balancing passenger trip time, customer loyalty, and the airline's economic profit. Passenger re-accommodation happens regularly during some disruptions and passenger over-sales.

The movement control system (MOCS) 122 deals with the fleet side of the operation which is almost everything that the operations control agent 108 experiences on a daily basis including short term planning, day of operation flight schedule, irregular operations, delays, weather, diversions, and/or emergencies.

The flight planning system 124 provides the flight dispatch agent 110 the tools and engine to calculate accurate flight plans based on company polices and regulatory and operational aspects such as fuel policy, crew duty times, Minimum Equipment List (MEL)/Configuration Deviation List (CDL) items, over fly charges, payload, weather, and/or NOTAMs which all impact the route planning.

The flight following system 126 is an Aircraft Situation Display (ASD) system supporting the flight tracking task of operations control agent 108 or flight dispatch agent 110 and provides decision-support in order to proactively approach safety or any other potentially hazardous condition during aircraft flight times. Weather overlay and/or traffic data feed integration provide fleet wide situation awareness for planning purposes.

The load planning system 128 supports the weight and balance process in order to generate the load plan. The load planning system 128 receives passenger information from the Departure Control System (DCS), flight route and fuel information from the flight planning system 124, and provides payload information back to the load planning system 128.

The maintenance control system (MCS) 130 provides a communication platform for maintenance controllers, pilots, crews, and aircraft mechanics. The MCS 130 tracks scheduled maintenance, provides aircraft assignments and maintenance times, and allows to interact with the Maintenance Planning System for unscheduled maintenance. MEL and CDL information is exchanged with the flight planning system 124 and the MOCS 122.

The crew management system (CMS) 132 is a scheduling and tracking system for crew members. The CMS 132 provides accurate information on crew schedules, crew member check-in times and delay, crew duty limitations and adherence to planned duties. Through additional systems such as crew fatigue risk management, crew control can proactively avoid potential crew fatigue incidents by swapping crews or shortening duty schedules.

The passenger reservations system (PRSS) 134 combines all passenger relevant information such as reservation record, fare, schedule, ticket record in the passenger name record (PNR). Additionally, information about the flight schedule and the flight capacity utilization information is provided. Passengers can be tracked as the DCS transfers all passenger records (checked-in, no show, or go show passengers) into the PRSS 134.

FIG. 2 is an example of an interaction model 200 illustrating interactions between agents 102 and systems 104 of a portion of the airline operations control center (AOCC) 100 in accordance with an example of the subject disclosure. For purposes of explanation, a portion of the AOCC 100 is illustrated in FIG. 2 and includes the ground control (GC) agent 112, a flight operations (FO) agent 202, the movement control system (MOCS) 122, the crew control (CC) agent 118, the crew management system (CMS) 132, the passenger control (PC) agent 120, and the passenger reservations system (PRSS) 134. A similar model can be generated including additional agents 102 and systems 104. However, the agents and systems shown in FIG. 2 are the primary agents and systems that interact in response to a disruptive event 204 as illustrated in FIG. 2. In accordance with the exemplary interaction model 200 the flight operations (FO) agent 202 combines the roles of the operations control agent 108 and the flight dispatch agent 110 in FIG. 1. In some examples, the roles of the operations control agent 108 and flight dispatch agent 110 are performed by the same agent or are handled differently in different countries or different airlines.

In the exemplary interactive model 200, a disruptive event 204 is determined by a GC agent 112. The GC agent 112 informs or provides situation awareness 206 to the FO agent 202 about the disruptive event 204. The FO agent 202 enters information 208 including the flight information and affected aircraft (ac) of the disruptive event 204 into the MOCS 122. The FO agent 202 can retrieve further information from the MOCS 122 in order to gain situation awareness. In the background, the MOCS 122, the CMS 132, and the PRSS 134 synchronize information 210. The FO agent 202 provides situation awareness 212*a* and 212*b* to the CC agent 118 and the PC agent 120 about the disruptive event 204. The CC agent 118 retrieves information 214 from the CMS 132 about the crew affected by the disruptive event 204. The PC agent 120 retrieves information 216 about the affected passengers from the PRSS 134. Each agent 102 starts an individual domain decision process 218*a*-218*c*. In accordance with the example in FIG. 2, the domain decision process 218*a*-218*c* uses the system, MOCS 122, CMS 132, and PRSS 134, associated with each particular agent. In accordance with an example, the domain decision process 218*a*-218*c* is a domain optimization process between the agent 102 of a specific domain, e.g., crew, passenger, flight operations, etc., and the associated system 104. The agent 102 optimizes the outcome for his particular domain. Each domain decision process 218*a*-218*c* is driven by individual motivational goals of each agent 102 and the knowledge about the disruptive event 204. In some examples, the system associated with each agent provides additional solutions for the given disruptive event 204. The CC agent 118 and the PC agent 120 perform a reasoning process 220*a* and 220*b*, which includes a decision making process about their respective suggested solution 222*a* and 222*b* that afterward is communicated to the FO agent 202. The FO agent 202 performs a reasoning process 224. Based on the FO agent's own suggested solution and the suggested solutions 222*a* and 222*b* from the CC agent 118 and the PC agent 120, the FO agent 202 consolidates a decision 226 that is executed amongst all the agents. Finally, each agent 202, 118, 120 applies applicable changes 228*a*-228*c* to the respective, associated system, MOCS 122, CMS 132, and PRSS 134, for aircraft, crew, and passenger.

Figure 3:
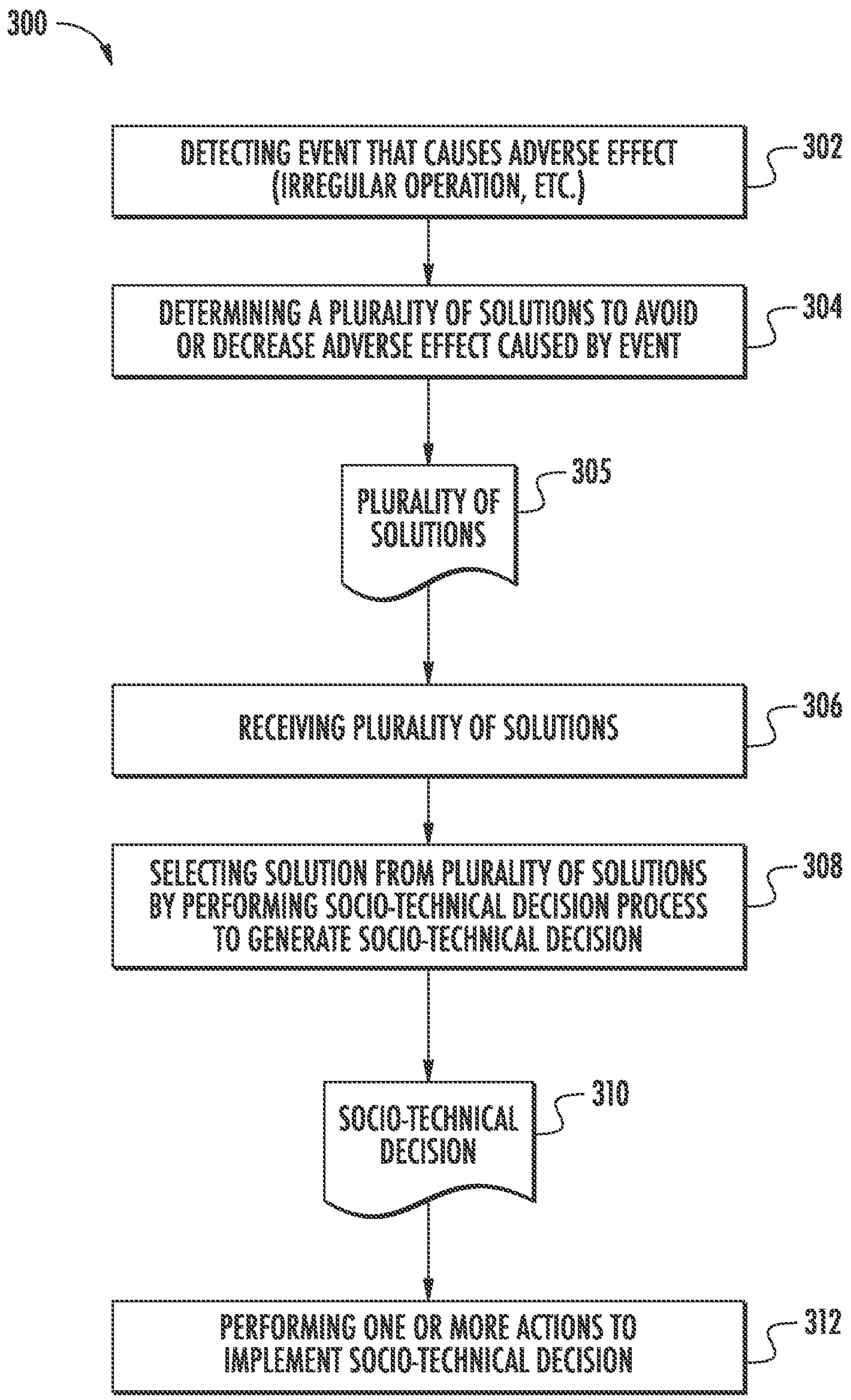
FIG. 3 is a flow chart of an example of a method for generating a solution to an operations control problem in accordance with an example of the subject disclosure.

FIG. 3 is a flow chart of an example of a method 300 for generating a solution to an operations control problem in accordance with an example of the subject disclosure. The method 300 is an example of operating an AOCC, such as the exemplary AOCC 100 in FIG. 1, in response to a disruptive event 204. The disruptive event 204 is an event that causes an adverse effect or irregular operation of the AOCC 100. Examples of a disruptive event 204 include but are not limited to an aircraft having a maintenance issue or other problem that causes a flight to be canceled, delayed or rerouted, a crew member being unable to make a flight, an issue at an airport that causes a flight to be cancelled, delayed or rerouted, weather or other environmental condition that causes a flight to be canceled, delayed or rerouted, or any other disruptive event that causes a flight to be canceled, delayed or rerouted. In block 302, the method 300 includes detecting an event that causes an adverse effect. In accordance with an example, the adverse effect is a disruption in operation of an aircraft causing an irregular operation of an AOCC.

In block 304, the method 300 includes determining a plurality of solutions 305 that are each implementable to avoid or decrease the adverse effect caused by the event. Examples of the plurality of solutions 305 include but are not necessarily limited to delaying a flight of the aircraft, rerouting the flight of the aircraft, canceling the flight of the aircraft, using another aircraft, using another crew, and booking passengers on another flight. In block 306, the method 300 includes receiving the plurality of solutions 305.

In block 308, the method 300 includes selecting a selected solution from the plurality of solutions by performing a socio-technical decision process to generate a socio-technical decision 310. The socio-technical decision 310 corresponds to the selected solution. Examples of methods for performing a socio-technical decision process are described with reference to FIGS. 4 and 5. An example of performing a socio-technical decision process 601 is illustrated in FIG. 6 and corresponds with the method 500 described with reference to FIG. 5.

In block 312, the method 300 includes performing one or more actions to implement the socio-technical decision 310. In some examples, performing the one or more actions to implement the socio-technical decisions includes displaying the one or more of the plurality of solutions 305, instructing appropriate personnel and/or devices to perform one or more of the plurality of solutions 305 and/or performing one or more of the plurality of solutions 305. In accordance with the example where the operations control center is an airline operations control center 100, examples of the actions include any actions to delay the flight of the aircraft, reroute the flight of the aircraft, cancel the flight of the aircraft, use another aircraft, use another crew, book passengers on another flight, or other solutions to avoid or decrease the adverse effects caused by a disruptive event.

Figure 4:
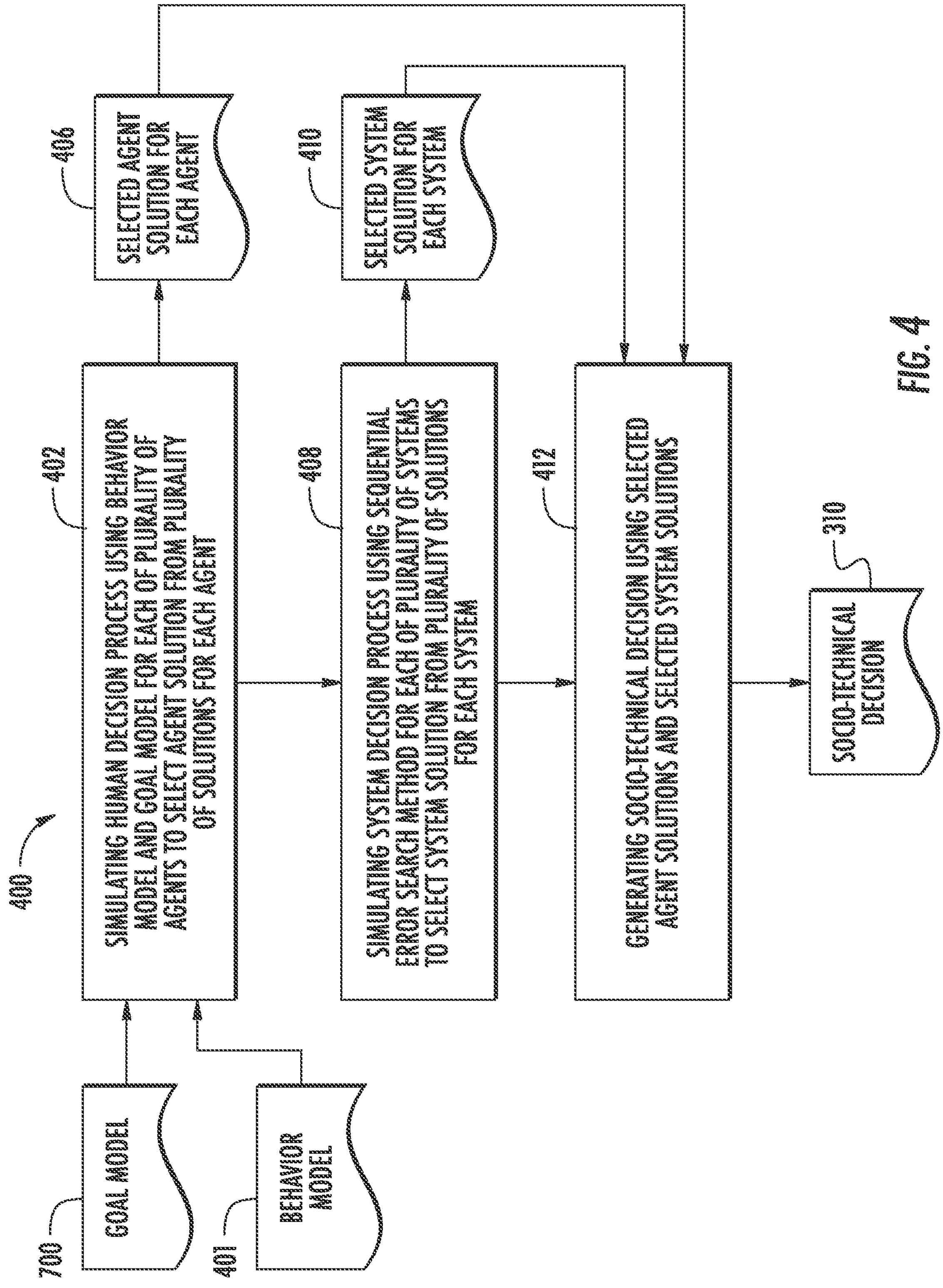
FIG. 4 is a flow chart of an example of a method for performing a socio-technical decision process in accordance with an example of the subject disclosure.

FIG. 4 is a flow chart of an example of a method 400 for performing a socio-technical decision process in accordance with an example of the subject disclosure. In block 402, the method 400 includes simulating a human decision process using a behavior model 401 and a goal model 700 for each of a plurality of agents to select an agent solution 406 from the plurality of solutions for each agent. An example of the behavior model 401 is the affective agent model 607 as described herein. An example of goal models 700*a*-700*c* for each of a plurality of agents will be described with reference to FIG. 7. As described in more detail with reference to FIG. 5, the goal model 700 takes into consideration an agent cost function that uses an affective agent model associated with the agent to describe affective behavior for the human decision process for determining an agent cost solution. An example of simulating a human decision process using an agent cost function for each agent to determine an agent cost solution for each agent will be described with reference to FIG. 8. In some examples, the agent cost solution is a best agent cost solution for a particular agent is based on the affective agent model associated with the particular agent and/or other criteria as described herein.

In block 408, the method 400 includes simulating a system decision process using a sequential error search method for each of a plurality of systems to select a system solution 410 from the plurality of solutions for each system. As described with reference to FIG. 5, simulating the system decision process includes using a system cost function to determine a system cost solution for each system. An example of simulating a system decision process using a system cost function to determine a system cost solution will be described with reference to FIGS. 9A and 9B. In some examples, determining a system cost solution includes determining a best system cost solution using a system cost function or other criteria as described herein.

In block 412, the method 400 includes generating a socio-technical decision 310 using the selected agent solutions 406 from block 402 and the selected system solutions 410 from block 408. The socio-technical decision 310 corresponds to the selected solution in block 308 of FIG. 3.

Figure 5:
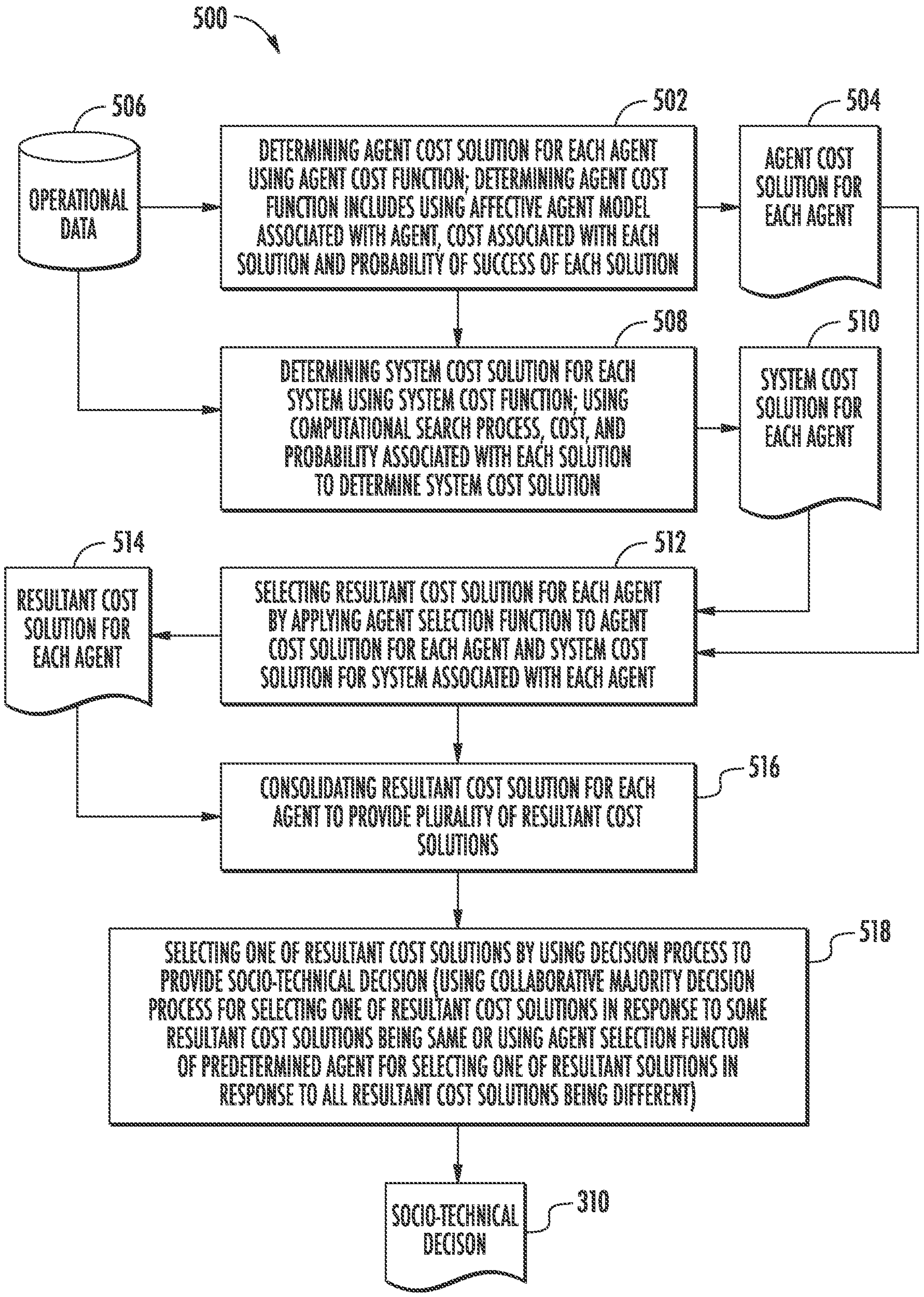
FIG. 5 is a flow chart of an example of a method for performing a socio-technical decision process in accordance with another example of the subject disclosure.
Figure 6:
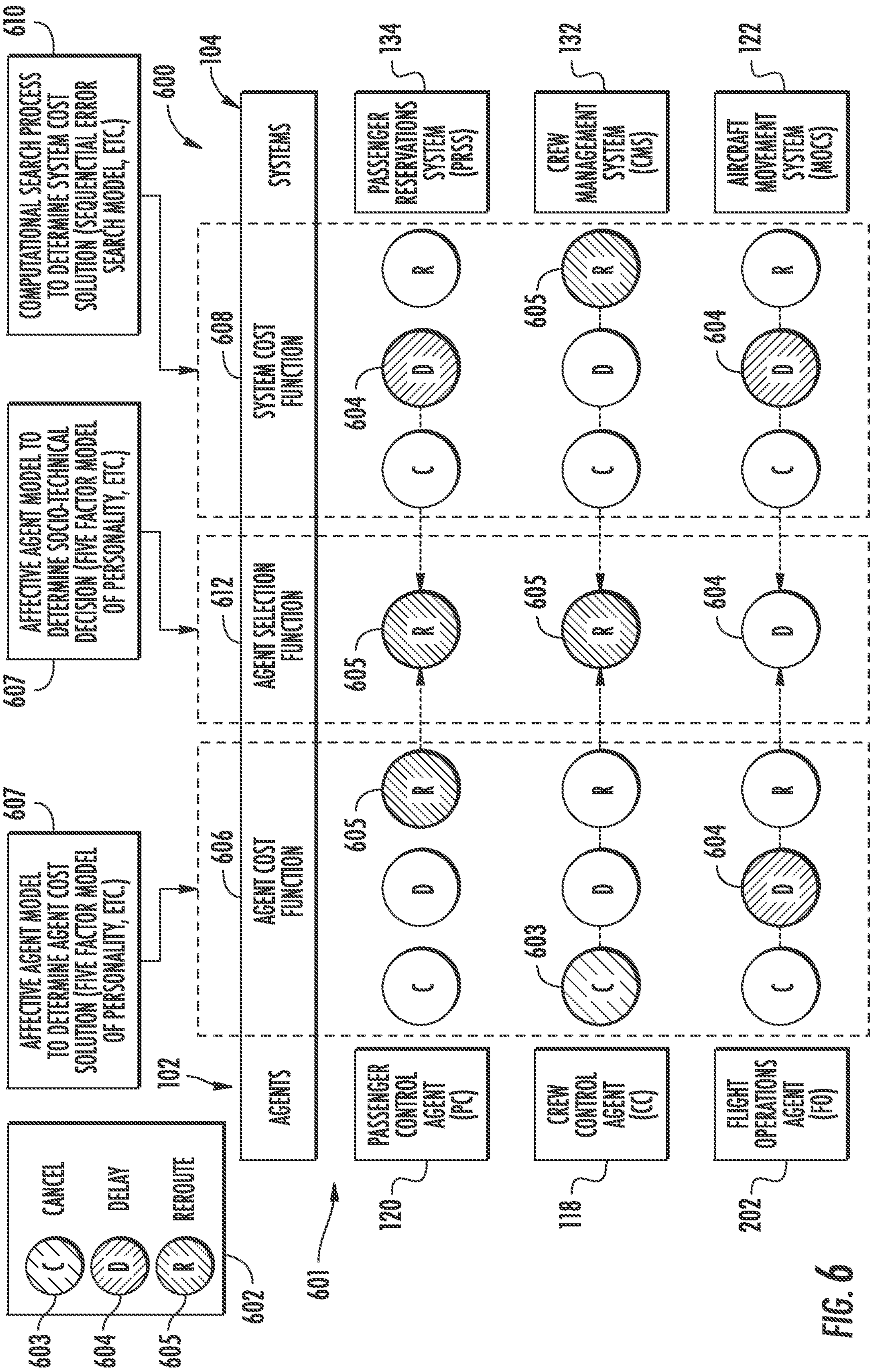
FIG. 6 is an example of a solution decision matrix for generating a socio-technical decision in accordance with an example of the subject disclosure.

FIG. 5 is a flow chart of an example of a method 500 for performing a socio-technical decision process in accordance with another example of the subject disclosure. The method 500 will also be described with reference to FIG. 6. FIG. 6 is an example of a solution decision matrix 600 for performing a socio-technical decision process 601 in accordance with an example of the subject disclosure. In the example in FIG. 6, the plurality of agents 102 of the AOCC 100 in FIG. 1 is reduced to three agents for purposes of describing the socio-technical decision process 601. However, the solution decision matrix 600 can be expanded to include other agents 102 and systems 104 in FIG. 1 depending on the nature of the disruptive event and the agents 102 and systems 104 involved in the socio-technical decision process 601. With additional agents and systems, the socio-technical decision process 601 would be performed similar to that described herein. In the example in FIG. 6, the three agents include the passenger control (PC) agent 120, the crew control (CC) agent 118, and the flight operations (FO) agent 202 (FIG. 2). The passenger control agent 120 is associated with and uses the passenger reservations system (PRSS) 134. The crew control agent 118 is associated with and uses the crew management system (CMS) 132. The flight operations agent 202 is associated with and uses the movement control system (MOCS) 122. For purposes of explanation, the plurality of solutions 602 in the example of FIG. 6 include cancel (C) 603 the flight, delay (D) 604 the flight, and reroute (R) 605 the flight. Other disruptive events can include more and/or different solutions.

In block 502 of FIG. 5, the method 500 includes determining an agent cost solution 504 from the plurality of solutions 602 (FIG. 6) for each of the plurality of agents 102 using an agent cost function 606 associated with each agent 102. A particular agent cost function 606 associated with each agent 102 is determined. Determining the particular agent cost function 606 includes using an affective agent model 607 associated with a particular agent 102, a cost for each solution 602, and a probability of success for each solution 602. An example of a cost of a particular solution 602 includes but is not limited to an amount of effort or a number of steps to perform the particular solution 602, monetary costs associated with any of the quality goals and/or functional goals described with respect to the goal models 700*a*-700*c* in FIG. 7. An example of a process for determining an agent cost solution 504 using an agent cost function 606 associated with each agent 102 will be described with reference to FIG. 8. FIG. 8 also illustrates using the affective agent model 607 associated with each agent 102 to determine the agent cost solution 504 for each agent 102. In some examples, the agent cost solution 504 corresponds to a best agent cost solution based on the affective agent model 607 or other criteria as described herein. The agent cost solution 504 is determined based on the best solution of the plurality of solutions 602 to satisfy the agent's quality goals and/or functional goals as described with reference to FIG. 8.

In accordance with some examples, the affective agent model 607 includes the Five-Factor Model (FFM) of personality. The Five-Factor Model (FFM) is described by R. R. McCrae and Costa, P. T., *Brief Versions of the NEO-PI-*3, Journal of Individual Differences 2007; Vol. 28(3) pp. 116-128. Five factors of personality of the Five-Factor Model of personality include openness, conscientiousness, extraversion, agreeableness, and neuroticism. In accordance with other examples, the affective agent model 607 includes another personality model, e.g., the Myers-Briggs-Type-Indicator (MBTI) or other personality model. As illustrated in the example in FIG. 8, the affective agent model 607 of each agent 102 includes one or more functional goals 802 and one or more quality goals 804. A cost 806 of a particular solution 602 is determined for an amount of effort or a number of steps 808 to perform the particular solution 602, and a probability of success 810 of the particular solution 602 is determined in satisfying the one or more functional goals 802 and/or the one or more quality goals 804 of a particular agent 102.

In the example in FIG. 6, the agent cost solution 504 for the passenger control agent 120 is determined to be reroute (R) 605 the flight using the agent cost function 606 and affective agent model 607 associated with the passenger control agent 120. An example of the process for determining an agent cost solution 504 for the passenger control agent 120 using an agent cost function 606 and affective agent model 607 associated with the passenger control agent 120 will be described with reference to FIG. 8.

The agent cost solution 504 for the crew control agent 118 is determined to be cancel (C) 603 the flight in the example in FIG. 6 using the agent cost function 606 and affective agent model 607 associated with the crew control agent 118. An example of the process for determining the agent cost solution 504 for the crew control agent 118 using an agent cost function 606 and affective agent model 607 associated with the crew control agent 118 will also be described with reference to FIG. 8.

In the example in FIG. 6, the agent cost solution 504 for the flight operations agent 202 is determined to be delay (D) 604 the flight using the agent cost function 606 and affective agent model 607 associated with the flight operations agent 202. An example of the process for determining the agent cost solution 504 for the flight operations agent 202 using an agent cost function 606 and affective agent model 607 associated with the flight operations agent 202 will also be described with reference to FIG. 8.

Referring back to FIG. 5, in some examples, determining the agent cost solution 504 for each agent 102 includes using operational data 506 obtained from previous events. The operational data 506 includes cost data and probability of success data for each of the plurality of solutions 602.

In block 508, the method 500 includes determining a system cost solution 510 from the plurality of solutions 602 (FIG. 6) for each of the plurality of systems 104 using a system cost function 608 associated with each system 104. In some examples, determining the system cost solution 510 for each system 104 includes using a computational search process 610, a cost (C) associated with each solution 602, and a probability (P) for each solution 602 to be selected. An example of determining a system cost solution 510 using a system cost function 608 associated with each system 104 will be described with reference to FIGS. 9A and 9B. In some examples, determining a system cost solution includes determining a best system cost solution using a cost (C), e.g., a number of steps to perform a particular solution 602 or other monetary costs of a particular solution 602, and a probability (P) which is a conditional probability that a particular solution 602 becomes the actual solution 602 that is implemented.

In the example in FIG. 6, the system cost solution 510 for the passenger reservations system 134 is determined to be delay (D) 604 the flight using the system cost function 608 associated with the passenger reservations system 134 and the computational search process 610. A computational search process 610 for determining the system cost solution 510 for the passenger reservations system 134 using a system cost function 608 associated with the passenger reservations system 134 is performed similar to that described with reference to FIGS. 9A and 9B.

The system cost solution 510 for the crew management system 132 is determined to be reroute (R) 605 the flight using the system cost function 608 associated with the crew management system 132 and the computational search process 610 in the example of FIG. 6. A computational search process 610 for determining the system cost solution 510 for the crew management system 132 using a system cost function 608 associated with the crew management system 132 is also performed similar to that described with reference to FIGS. 9A and 9B.

In the example in FIG. 6, the system cost solution 510 for the movement control system 122 is determined to be delay (D) 604 the flight using the system cost function 608 associated with the movement control system 122 and the computational search process 610. A computational search process 610 for determining the system cost solution 510 for the movement control system 122 using a system cost function 608 associated with the movement control system 122 is also performed similar to that described with reference to FIGS. 9A and 9B.

Referring back to FIG. 5, in some examples, determining the system cost solution 510 for each system 104 includes using operational data 506 obtained from previous events. The operational data 506 includes cost data and probability of success data for each of the plurality of solutions 602.

In block 512, the method 500 includes selecting a resultant cost solution 514 for each agent by applying an agent selection function 612 (FIG. 6) associated with a particular agent 102 to the agent cost solution 504 for the particular agent 102 and the system cost solution 510 for the system 104 associated with the particular agent 102. In some examples, the agent selection function 612 associated with a particular agent 102 includes using the affective agent model 607 associated with the particular agent 102 similar to that described with respect to the determining the agent cost function in block 502. In accordance with an example, the agent selection function 612 includes the particular agent 102 deciding which of the two solution, the agent cost solution 504 or the system cost solution 510, the particular agent 102 trusts the most or believes in the most. The agreeableness (A) personality trait has been found as the most applicable trait amongst the five-factor model with regard to trust. Accordingly, an agent with an agent selection function 612 based on a low (e.g., lower than a defined threshold) A-score will favor their own goals and decide their own solution before the system solution compared to other agents with a higher A-score. An agent with an agent selection function 612 based on a high A-score will have a high trust in other solutions and would be more agreeable to select the system cost solution 510 compared to the agent with the low A-score. In some examples, the resultant cost solution is also referred to as a resultant best cost solution.

In the example in FIG. 6, the resultant cost solution 514 for the passenger control agent 120 is determined to be reroute (R) 605 by applying the agent selection function 612 associated with the passenger control agent 120 to the agent cost solution 504 (reroute (R) 605) for the passenger control agent 120 and the system cost solution 510 (delay (D) 604) for the passenger reservations system 134.

In the example in FIG. 6, the resultant cost solution 514 for the crew control agent 118 is determined to be reroute (R) 605 by applying the agent selection function 612 associated with the crew control agent 118 to the agent cost solution 504 (cancel (C) 603) and the system cost solution 510 (reroute (R) 605) for the crew management system 132.

In the example is FIG. 6, the agent cost solution 504 is delay (D) 604 for the flight operations agent 202 and the system cost solution 510 is also delay (D) 604 for the movement control system 122. Therefore, the resultant cost solution 514 is also delay (D) 604. Because the agent cost solution 504 and the system cost solution 510 are the same, the agent selection function 612 would not need to be applied to the best cost solutions.

Referring back to FIG. 5, in block 516, the method 500 includes consolidating the resultant cost solution 514 for each agent to provide a plurality of resultant cost solutions.

In block 518, the method 500 includes selecting one of the resultant cost solutions 514 by using a decision process to generate the socio-technical decision 310. The socio-technical decision 310 avoids or decreases the adverse effect caused by the event. In some examples, using the decision process includes one of: using a collaborative majority decision process for selecting one of the resultant cost solutions 514 in response to some of the resultant cost solutions 514 being a same solution; and using the agent selection function 612 of a predetermined agent 102 of the plurality of agents 102 for selecting one of the resultant cost solutions 514 in response to all of the resultant cost solutions 514 being different. In accordance with an example, the predetermined agent 102 is the flight operations agent 202. Using the agent selection function 612 includes applying the affective agent model 607 for the flight operations agent 202 to the resultant cost solutions 514 to select the one resultant cost solutions based on the flight operations agent's affective agent model 607.

Figure 7:
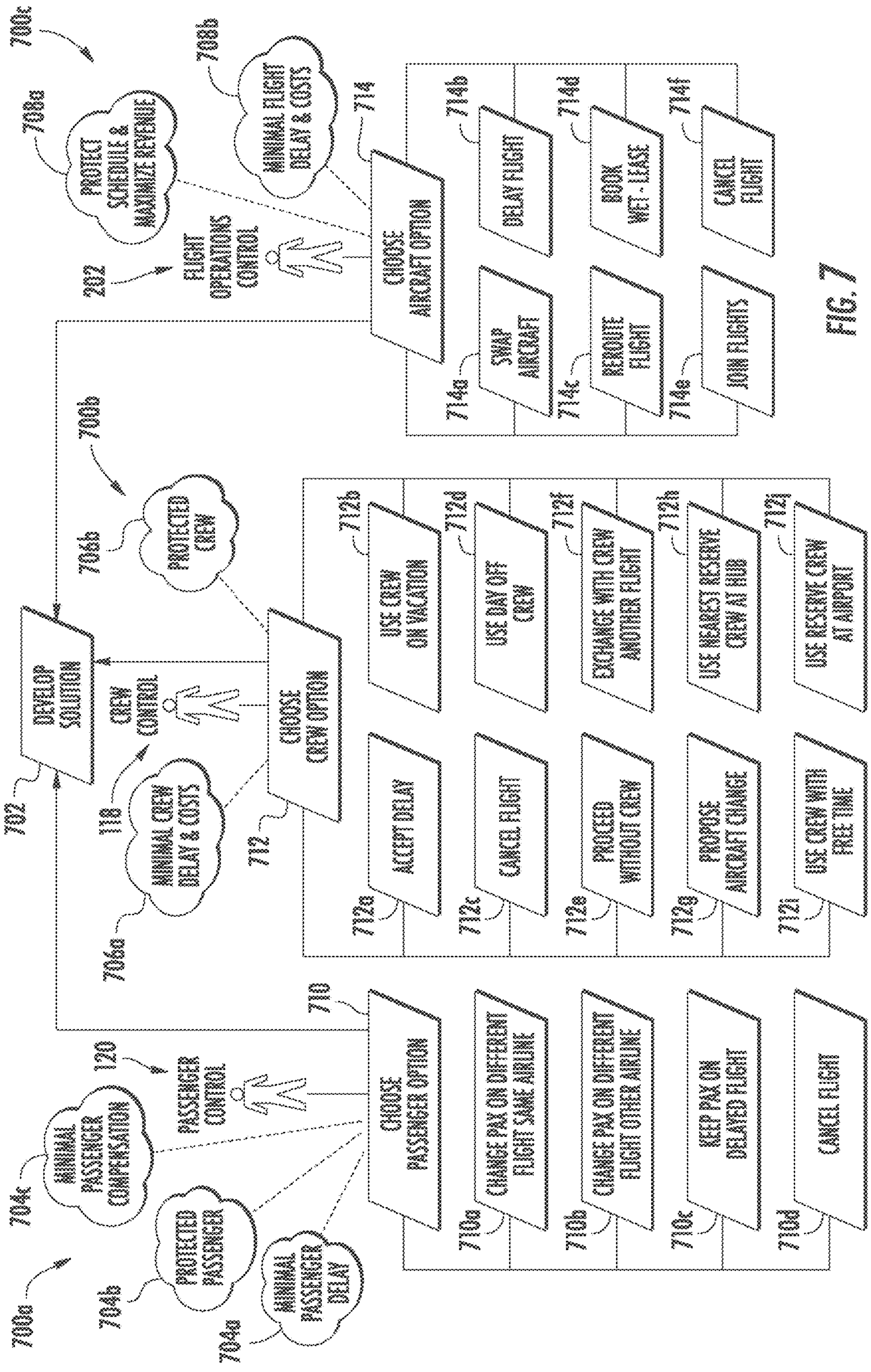
FIG. 7 is an example of goal models for different agents including solutions for different aircraft, crew and/or passenger problems in accordance with an example of the subject disclosure.

FIG. 7 is an example of goal models 700*a*-700*c* for each of the agents 118, 120 and 202 including solutions for different aircraft, crew and passenger problems in accordance with an example of the subject disclosure. The exemplary goal models 700*a*-700*c* include a goal model 700*a* for a passenger control agent 120, a goal model 700*b* for a crew control agent 118, and a goal model 700*c* for a flight operations agent 202. The exemplary goal models 700*a*-700*c* are for the same agents in the example in FIG. 6 to illustrate how the agent cost function 606 associated with each agent is used to determine a agent cost solution 504 from the plurality of solutions 602 for each agent and how the agent selection function 612 is used to select a resultant cost solution 514 for each agent. The resultant cost solution 514 for each of the agents is used to develop a solution 702. The solution 702 corresponds to the socio-technical decision 310 as described with reference to FIG. 5.

The goal models 700*a*-700*c* are used to interpret the goal-driven behavior of each agent 118, 120, 202. Each goal model 700*a*-700*c* includes quality goals 704, 706 and 708 illustrated in clouds associated with each agent 118, 120, 202, and function goals 710, 712 and 714, illustrated in rectangular boxes associated with each agent. The functional goals 710, 712 and 714 are examples of functional goals for an irregular operations situation in an Airline Operations Control Center 100. The exemplary quality goals 704, 706 and 708 are described with respect to a particular disruptive event. In accordance with an exemplary scenario an aircraft is disrupted through a maintenance issue and through consecutive delays, the flying crew is at risk to violate their duties. Maintenance has not given clear indication when the aircraft can be expected to depart. There is an alternative option in which another crew would fly as standby-crew to an alternate location in order to continue the flight, so that the actual crew can end their duties without violation. However, this is all dependent on the aircraft airworthiness status. Another alternative option for the crew control agent 118 is to utilize a crew that came in the same day and is available at the current airport; however, this crew has a day off. The airline has no other aircraft available at this point. Accordingly, the only other option besides delaying the flight and rerouting the aircraft, would be to cancel the flight. The passenger control agent 120 is heavily relying on the decision from the crew control agent 118 and the flight operations agent 202. The interpretation of the goals in terms of the solution effect or number of steps and success probability for each agent is described with reference to FIG. 8.

Examples of the quality goals 704 for the passenger control agent 120 include but are not necessarily limited to minimal passenger delay 704*a*, ensuring the passenger is protected 704*b*, and minimal passenger compensation 704*c*. An example of a functional goal 710 for the passenger control agent 120 is choosing a passenger solution option 710*a*-710*b*. Examples of passenger solution options 710*a*-710*d* include but are not limited to change the passenger on a different flight on the same airline 710*a*, change the passenger on a different flight on another airline 710*b*, keep the passenger on the delayed flight 710*c*, and cancel the flight 710*d*.

Examples of quality goals 706 for the crew control agent 118 include but are not necessarily limited to minimal crew delay and costs 706*a* and ensuring the crew is protected 706*b* as described in more detail below. An example of a function goal 712 for the crew control agent 118 is choosing a crew solution option 712*a*-712*j*. Examples of crew solution options 712*a*-712*j* include but are not limited to accept the delay 712*a*, use another crew that is on vacation 712*b*, cancel the flight 712*c*, use another crew that has a day off 712*d*, proceed without the current crew 712*e*, exchange the current crew with a crew from another flight 712*f*, propose a change to another aircraft 712*g*, use nearest reserve crew at a hub 712*h*, use another crew with free time 712*i*, and use a reserve crew at the airport 712*j*.

Examples of quality goals 708 for the flight operations agent 202 include but are not necessarily limited to protect the flight schedule and maximize airline revenue 708*a* and minimize flight delays and costs 708*b*. An example of a function goal 714 for the flight operations agent 202 is choosing an aircraft solution option 714*a*-714*f*. Examples of aircraft solutions include but are not limited to swap the aircraft with another aircraft 714*a*, delay the flight 714*b*, reroute the flight 714*c*, book a wet-lease aircraft to replace the aircraft with the maintenance issue 714*d*, join or combine flight with another flight 714*e*, and cancel flight 714*f*.

As previously described with respect to block 402 in FIG. 4, a human decision process is simulated using the goal model 700*a*, 700*b* and 700*c* for each agent 118, 120, and 202. The goal model 700*a*, 700*b* and 700*c* for each agent 118, 120 and 202 takes into consideration the agent cost function 606 that uses an affective agent model 607 (FIG. 6) associated with each agent 118, 120 and 202 to describe the human decision process for determining an agent cost solution 504 (FIG. 5). In accordance with an example, the agent cost function 606 for a particular agent is represented by equation 1:

$$f(p) = \frac{1 + \#\text{steps}(p) * wSS(C_{score}) + \#\text{open Preconditions}(p) * wOP(C_{score})}{\text{probability}(p) * wPr(C_{score})}$$

Where steps(p) is an amount of effort or number of steps for a particular plan (p) or solution 602;

wSS($C_{score}$) is a weighting factor for the amount of effort based on a C-trait or conscientiousness trait of the goal model 700 or affective agent model 607 for a particular agent 102;

#openPreconditions(p) is a number of preconditions associated with the particular plan (p) or solution 602;

wOP($C_{score}$) is another weighting factor for preconditions based on the conscientiousness trait of the goal model 700 or affective agent model 607 for a particular agent 102;

probability(p) is the probability of success of the particular plan (p) or solution 602 in satisfying the quality goals of a particular agent 102;

wPr($C_{score}$) is another weighting factor for the probability based on the conscientiousness trait of the goal model 700 or affective agent model 607 of a particular agent 102.

The $C_{score}$ corresponds to the degree of organization and motivation for goal-driven behavior. For example, high C-scores are characteristic of people that are scrupulous, punctual, well-organized, cautious deliberate, and reliable. Low C-scores are characteristic of people that are lackadaisical in working toward their goals, unmethodical, hasty, act without considering consequences, etc.

FIG. 8 is an example of a table 800 illustrating determining an agent cost solution 504 using an agent cost function 606 and affective agent model 607 associated with each agent 118, 120 and 202 in accordance with an example of the subject disclosure. With respect to the crew control agent 118, the crew control agent's main quality goal 804 is to protect the crews 706*b* in order to keep the crews happy and the crew schedule sound. This can mean that a violated crew needs to be avoided, but also a crew with a day off should be protected. Any additional assignment or change to a crew's initial duty plan, such as rerouting, is preferably avoided. The solution to cancel (C) 603 the flight has the best agent cost solution from an effort perspective or number of steps 808 and consequently is assessed with a low cost 806 using the goal model 700*b* (FIG. 7) or the agent cost function 606 and affective agent model 607 for the crew control agent 118. In the example in FIG. 6, the cancel (C) 603 solution is indicated as the best agent cost solution 504 for the crew control agent 118. The effort or number of steps 808 to protect the crew for the solution to delay (D) 604 the flight is evaluated with a high cost in the example in FIG. 8, whereas the effort for rerouting (R) 605 the flight has a medium cost using the goal model 700*b* or the agent cost function 606 and affective agent model 607 for the crew control agent 118. The solution 602 to cancel (C) 603 the flight has a low cost 806 from a probability of success 810 because the flight might depart the next day at the same time. The solution 602 to delay (D) 604 and reroute (R) 605 the flight are assessed with a high cost 806 from a probability for success 810 using the goal model 700*b* (FIG. 7) or the agent cost function 606 and affective agent model 607 associated with the crew control agent 118. The delay (D) 604 and reroute (R) 605 are assessed with a high cost 806 because these solutions 602 have a high probability of success to protect the crew 706*b* which is the quality goal 804 for the crew control agent 118.

With respect to the passenger control agent 120, a happy passenger or protected passenger 704*b* is the key quality goal 804 of the passenger control agent 120. To fulfill the quality goal 804, the passenger control agent 120 wants to avoid any delay 604, compensation to the passenger, or cancellation 603 of the flight. As a result, a cancellation 603 of the flight is not in the interest of the passenger control agent 120 and cancellation 603 is assessed with high cost in terms of effort or number of steps and a low cost from a probability of success using the goal model 700*a* (FIG. 7) or the agent cost function 606 and affective agent model 607 for the passenger control agent 120. For the solution 602 to delay 604 the flight, the effort or number of steps 808 have a rather low cost since only a small amount of compensation as well as additional meals for the passenger can be accounted for. For the solution 602 to reroute 605 the flight, the passengers will have a much larger delay through the additional flight hours and a stop-over. Accordingly, compensation to the passenger is needed and the effort or number of steps 808 is estimated to have a medium cost 806. Both solutions 602, delay 604 and reroute 605, are promising solutions from a probability of success 810 viewpoint. As a result, the delay 604 solution and the reroute 605 solution are assessed with a high cost 806 using the goal model 700*a* or using the agent cost function 606 and affective agent model 607 for the passenger control agent 120. In the example in FIG. 6, the reroute solution 605 is illustrated as the best agent cost solution 504 for the passenger control agent 120.

With respect to the flight operations agent 202, the flight operations agent 202 unifies the overall responsibility of the airline operation control center 100 as duty manager and the responsibility for the airline's fleet of aircraft. The flight operations agent 202 has a quality goal 804 which is to protect the flight schedule 708*a* and to avoid delay 604 and cancel 603 solutions as much as. This goes hand-in-hand with minimal flight costs in order to save revenue. The cancel 603 solution for the flight operations agent 202 is the least desirable solution 602 to protect the schedule because the cancel 603 solution impacts not just the single flight but the entire network schedule. Therefore, the cancel 603 solution is assessed with low cost from a probability of success 810 standpoint. Nevertheless, the cancel 603 solution is the estimated with the lowest effort or number of steps, as the flight would be continued potentially the next day and therefore is assessed with a low cost using the goal model 700*c* or agent cost function 606 and affective agent model 607 for the flight operations agent 202. The delay 604 solution is evaluated as high cost from a probability of success perspective because the amount of dependencies is lower than compared to the reroute 605 solution, which is assessed with medium cost. This also can be applied to the number of steps 808 needed to conduct the delay 604 solution compared to reroute 605 solution using the goal model 700*a* or agent cost function 606 and affective agent model 607 for the flight operations agent 202. In the example in FIG. 6, the delay (D) 604 solutions is indicated as the best agent cost solution for the flight operations agent 202.

FIGS. 9A and 9B are examples of tables 900*a* and 900*b* illustrating determining a system cost solution 510 (FIG. 5) using a system cost function 608 associated with a particular system 122, 132 or 134 in accordance with an example of the subject disclosure. The exemplary solutions 602 include cancel 603 the flight, delay 604 the flight, and reroute 605 the flight, to use the same examples as the examples in FIGS. 6 and 8, to explain the process of determining a system cost solution 510 in FIG. 5 for a system. In some examples, each system 122, 132, and 134 uses a system cost function 608 that includes a cost (C) 902, e.g., a number of steps to perform a particular solution 602, and a probability (P) 904 which is the conditional probability that a particular solution 602 becomes the actual solution 602 that is implemented. The example in FIGS. 9A and 9B is for a particular one of the systems 104 but the same process would be usable for any system, except the cost (C) 902 and probability (P) 904 values for each solution 602 can differ from one system to another. A quotient (P/C) 906 is calculated by the probability (P) divided by the cost (C) for each solution 602. In FIG. 9B, the quotients 906 are rank ordered in descending order. The solution 602 with the lowest remaining cost (E[τ] or E(Tau)) 908 corresponds to the system cost solution 510 for the particular system. In the example in FIG. 9B, the delay (D) 604 solution has the lowest remaining cost 908 in response to rank ordering the quotients 906 in descending order. In some examples, the system cost solution is also a best system cost solution based on the cost and probability.

The example described with reference to FIGS. 9A and 9B is based on an algorithm described by Mergenthaler, W., *The Total Repair Cost in a Defective, Coherent Binary System*," Cybernetics and Systems 13.3, pp. 219-243. Given $P(p_i|x_1, \ldots x_{i-1})$ is the conditional probability that $p_i$ is the solution, if all test cases before are assumed zero (0), then the conditional expectation for the remaining cost is defined by equation 2:

$$E[\tau|0, \ldots ,0]=P(p_i|x_i, \ldots ,x_{i-1})*C_i+(1-P(p_i|x_1, \ldots ,x_{i-1})*E(\tau|0, \ldots ,0,0)$$

According to Mergenthaler, the lowest remaining cost (E[τ]) can be minimized, if the possible plans ($p_i$) or solutions 602 are ordered by their quotients 906 in descending order as shown in FIG. 9B.

Figure 10:
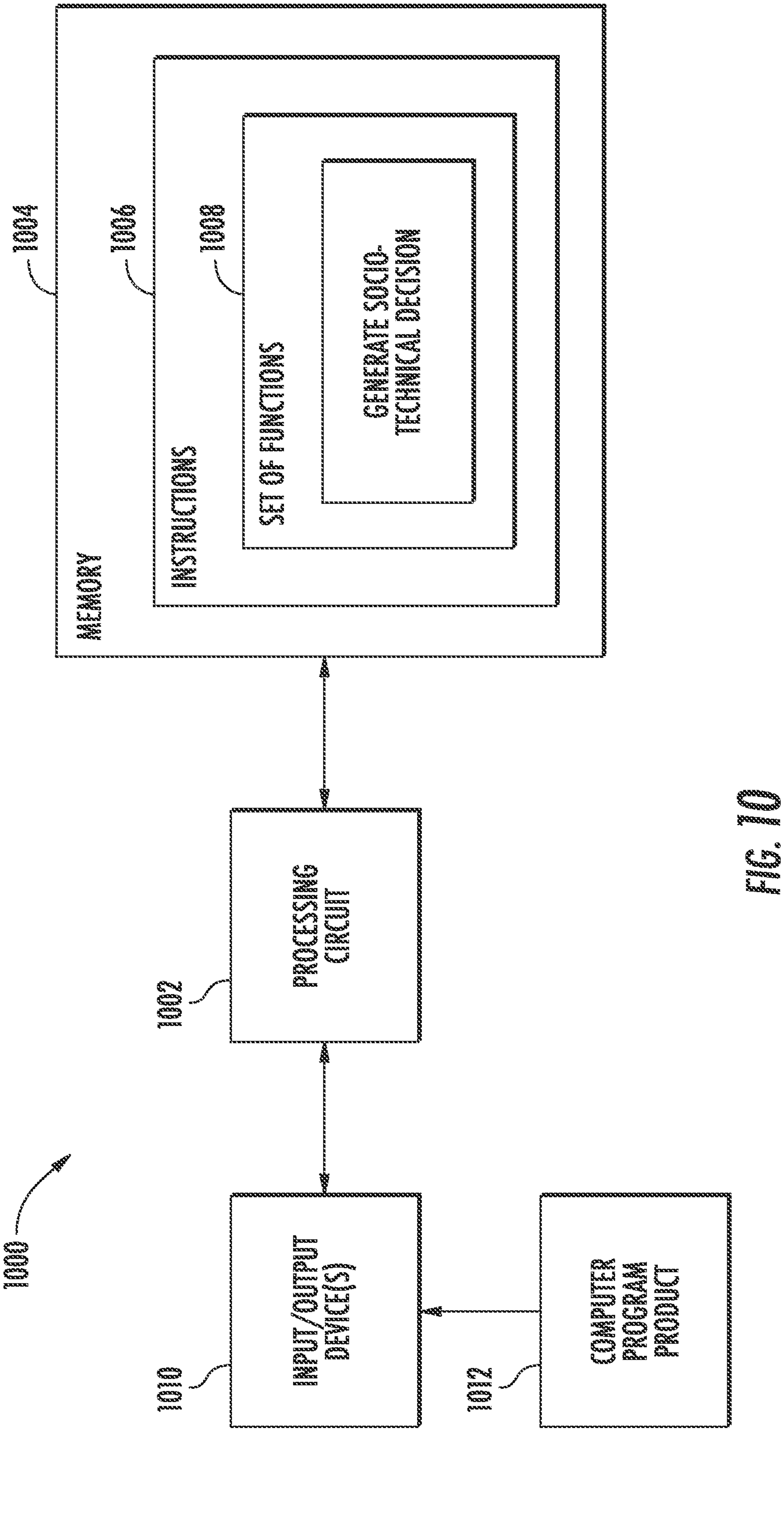
FIG. 10 is an example of a system for performing operations in accordance with an example of the subject disclosure.

FIG. 10 is an example of a system 1000 for performing operations in accordance with an example of the subject disclosure. In accordance with some examples, the method 300, 400 and/or 500 are embodied in and performed by the system 1000. In some examples, the systems 104 in FIGS. 1, 2 and 6 are embodied in one or more systems that are the same or similar to the system 1000. The system 1000 includes a processing circuit 1002 and a memory 1004 associated with the processing circuit 1002. The memory 1004 includes computer-readable program instructions 1006 that, when executed by the processing circuit 1002 causes the processing circuit 1002 to perform a set of functions 1008. In accordance with an example the set of functions 1008 are configured to generate a socio-technical decision the same or similar to that described with respect to methods 300, 400, and/or 500.

In some examples, the system 1000 also includes one or more input/output devices 1010 including separate input devices, output device or combination input and output devices. Examples of the input/output devices 1010 include but are not limited to a display device, a keyboard or keypad, pointing device, and a device configured to read or access computer-readable program instructions on a computer program product 1012 similar to that described herein. The method 300, 400, and/or 500 can be embodied on the computer program product 1012, read by the input/output device 1010 and stored in the memory 1004. Examples of inputs include but are not limited to inputs such as those by the agents 102 described with reference to FIG. 2. Examples of outputs include but are not limited to agent solutions, system solutions, resultant solutions and socio-technical decisions as described herein. The outputs are used to perform the one or more actions 312. Additionally or optionally, memory 1004 can store data, such as, but not limited to, operational data 506 and/or historical data, the plurality of solutions, the simulated models (e.g., goal model 700, agent models and/or functions), the socio-technical decision (e.g., 310), tables (e.g., tables 800, 900*a*, and 900*b*), data logs and/or records, etc.

In accordance with an example, an airline operations control center, e.g., the AOCC 100 in FIG. 1 includes the system 1000.

Further, the disclosure comprises examples according to the following clauses:

Clause 1. A method, comprising:

receiving, by a processing circuit, a plurality of solutions to avoid or decrease an adverse effect caused by an event;

selecting, by the processing circuit, a selected solution from the plurality of solutions by performing a socio-technical decision process, wherein the socio-technical decision process comprises:

simulating a human decision process using a behavior model and a goal model for each of a plurality of agents to select an agent solution from the plurality of solutions for each agent;

simulating a system decision process using a sequential error search method for each of a plurality of systems to select a system solution from the plurality of solutions for each system; and generating a socio-technical decision using the selected agent solutions and the selected system solutions, wherein the socio-technical decision corresponds to the selected solution; and facilitating a performance of one or more actions to implement the socio-technical decision.

Clause 2. The method of clause 1, wherein performing the socio-technical decision process comprises:

determining an agent cost solution from the plurality of solutions for each of the plurality of agents using an agent cost function associated with each agent;

determining a system cost solution from the plurality of solutions for each of the plurality of systems using a system cost function associated with each system;

selecting a resultant cost solution for each agent by applying an agent selection function associated with a particular agent to the agent cost solution for the particular agent and the system cost solution for the system associated with the particular agent;

consolidating the resultant cost solution for each agent to provide a plurality of resultant cost solutions; and selecting one of the resultant cost solutions by using a decision process to generate the socio-technical decision, wherein the socio-technical decision avoids or decreases the adverse effect caused by the event.

Clause 3. The method of and of clauses 1 or 2, wherein using the decision process comprises one of:

using a collaborative majority decision process for selecting one of the resultant cost solutions in response to some of the resultant cost solutions being a same solution; and using the agent selection function of a predetermined agent of the plurality of agents for selecting one of the resultant cost solutions in response to all of the best cost solutions being different.

Clause 4. The method of any of clauses 1-2 or 3, further comprising determining a particular agent cost function associated with each agent, wherein determining the particular agent cost function comprises using an affective agent model associated with a particular agent of the plurality of agents, a cost for each solution, and a probability of success for each solution.

Clause 5. The method of any of clauses 1-3 or 4, wherein the affective agent model comprises a five-factor model of personality, and wherein five factors of personality of the five-factor model comprise openness, conscientiousness, extraversion, agreeableness, and neuroticism.

Clause 6. The method of any of clauses 1-4 or 5, wherein the affective agent model associated with each agent comprises one or more functional goals and one or more quality goals and wherein the cost of a particular solution is determined for an amount of effort or a number of steps to perform the particular solution, and a probability of success of the particular solution is determined in satisfying at least one of the one or more functional goals or the one or more quality goals of a particular agent.

Clause 7. The method of any of clauses 1-5 or 6, wherein determining the agent cost solution for each agent comprises using operational data obtained from a previous event, wherein the operational data comprises at least one of cost data or probability of success data for at least one of the plurality of solutions.

Clause 8. The method of any of clauses 1-6 or 7, further comprising using a computational search process and a cost associated with each solution to determine the system cost solution for each system.

Clause 9. The method of any of clauses 1-7 or 8, wherein using the system cost function comprises:

determining a cost (C) for each solution for a particular system;

determining a probability (P) for each solution being selected by the particular system; and performing the sequential error search method to determine the system cost solution for the particular system.

Clause 10. The method of any of clauses 1-8 or 9, further comprising:

calculating a quotient of the probability divided by the cost (P/C) for each solution; and rank ordering the quotients in descending order, wherein the solution with a lowest remaining cost corresponds to the system cost solution for the particular system.

Clause 11. The method of any of clauses 1-9 or 10, further comprising using operational data obtained from previous events, wherein the operational data comprises cost data and probability of success data for each of the plurality of solutions.

Clause 12. The method of any of clauses 1-10 or 11, wherein the event comprises a disruption in operation of an aircraft causing an irregular operation associated with an airline operations control center.

Clause 13. The method of any of clauses 1-11 or 12, further comprising determining the plurality of solutions to avoid or decrease the adverse effect, wherein the plurality of solutions comprises at least one of data associated delaying a flight of the aircraft, rerouting the flight of the aircraft, canceling the flight of the aircraft, using another aircraft, using another crew, or booking passengers on another flight.

Clause 14. The method of any of clauses 1-12 or 13, wherein the plurality of agents comprises at least one of an operations control agent, a passenger control agent, a ground control agent, a flight dispatch agent, a crew control agent, or a maintenance control agent.

Clause 15. The method of any of clauses 1-13 or 14, wherein the plurality of systems comprises at least one of a movement control system, a flight planning system, a flight following system, a load planning system, a maintenance control system, a crew management system, or a passenger reservations system.

Clause 16. A system, comprising:

a processing circuit; and a memory associated with the processing circuit, the memory comprising computer-readable program instructions that, when executed by the processing circuit causes the processing circuit to perform a set of functions comprising:

receiving solution data indicative of a plurality of solutions to avoid or decrease an adverse effect caused by an event;

selecting a selected solution from the plurality of solutions by performing a socio-technical decision process, wherein the socio-technical decision process comprises:

simulating a human decision process using a behavior model and a goal model for each of a plurality of agents to select an agent solution from the plurality of solutions for each agent;

simulating a system decision process using a sequential error search method for each of a plurality of systems to select a system solution from the plurality of solutions for each system; and generating a socio-technical decision using the selected agent solutions and the selected system solutions, wherein the socio-technical decision corresponds to the selected solution; and instructing at least one device to perform one or more actions to implement the socio-technical decision.

Clause 17. The system of clause 16, wherein performing the socio-technical decision process comprises:

determining an agent cost solution from the plurality of solutions for each of the plurality of agents using an agent cost function associated with each agent;

determining a system cost solution from the plurality of solutions for each of the plurality of systems using a system cost function associated with each system;

selecting a resultant cost solution for each agent by applying an agent selection function associated with a particular agent to the agent cost solution for the particular agent and the system cost solution for the system associated with the particular agent;

consolidating the resultant cost solution for each agent to provide a plurality of resultant cost solutions; and selecting one of the resultant cost solutions by using a decision process to generate the socio-technical decision, wherein the socio-technical decision avoids or decreases the adverse effect caused by the event.

Clause 18. The system of any of clauses 16 or 17, wherein using the decision process comprises one of:

using a collaborative majority decision process for selecting one of the resultant cost solutions in response to some of the resultant cost solutions being a same solution; and using the agent selection function of a predetermined agent of the plurality of agents for selecting one of the resultant cost solutions in response to all of the best cost solutions being different.

Clause 19. The system of any of clauses 16-17 or 18, further comprising determining a particular agent cost function associated with each agent, wherein determining the particular agent cost function comprises using an affective agent model associated with a particular agent of the plurality of agents, a cost for each solution, and a probability of success for each solution.

Clause 20. The system of any of clauses 16-18 or 19, wherein the affective agent model comprises a five-factor model of personality, and wherein five factors of personality of the five-factor model comprise openness, conscientiousness, extraversion, agreeableness, and neuroticism.

Clause 21. The system of any of clauses 16-19 or 20, wherein the affective agent model associated with each agent comprises one or more functional goals and one or more quality goals and wherein the cost of a particular solution is determined for an amount of effort or a number of steps to perform the particular solution, and a probability of success of the particular solution is determined in satisfying at least one of the one or more functional goals or the one or more quality goals of a particular agent.

Clause 22. The system of any of clauses 16-20 or 21, wherein determining the agent cost solution for each agent comprises using operational data obtained from a previous event, wherein the operational data comprises at least one of cost data or probability of success data for at least one of the plurality of solutions.

Clause 23. The system of any of clauses 16-21 or 22, further comprising using a computational search process and a cost associated with each solution to determine the system cost solution for each system.

Clause 24. The system of any of clauses 16-22 or 23, wherein using the system cost function comprises:

determining a cost (C) for each solution for a particular system;

determining a probability (P) for each solution being selected by the particular system; and performing the sequential error search method to determine the system cost solution for the particular system.

Clause 25. The system of any of clauses 16-23 or 24, further comprising:

calculating a quotient of the probability divided by the cost (P/C) for each solution; and rank ordering the quotients in descending order, wherein the solution with a lowest remaining cost corresponds to the system cost solution for the particular system.

Clause 26. The system of any of clauses 16-24 or 25, further comprising using operational data obtained from previous events, wherein the operational data comprises cost data and probability of success data for each of the plurality of solutions.

Clause 27. The system of any of clauses 16-25 or 26, wherein the event comprises a disruption in operation of an aircraft causing an irregular operation associated with an airline operations control center.

Clause 28. The system of any of clauses 16-26 or 27, further comprising determining the plurality of solutions to avoid or decrease the adverse effect, wherein the plurality of solutions comprises at least one of data associated with delaying a flight of the aircraft, rerouting the flight of the aircraft, canceling the flight of the aircraft, using another aircraft, using another crew, or booking passengers on another flight.

Clause 29. The system of any of clauses 16-27 or 28, wherein the plurality of agents comprises at least one of an operations control agent, a passenger control agent, a ground control agent, a flight dispatch agent, a crew control agent, or a maintenance control agent.

Clause 30. The system of any of clauses 16-28 or 29, wherein the plurality of systems comprises at least one of a movement control system, a flight planning system, a flight following system, a load planning system, a maintenance control system, a crew management system, or a passenger reservations system.

Clause 31. An airline operations control center, comprising:

a system for generating a socio-technical decision in response to an event that causes irregular operation of the airline operations control center, wherein the system comprises:

a processing circuit; and a memory associated with the processing circuit, the memory comprising computer-readable program instructions that, when executed by the processing circuit causes the processing circuit to perform a set of functions comprising:

receiving a plurality of solutions to avoid or decrease an adverse effect caused by the event;

selecting a selected solution from the plurality of solutions by performing a socio-technical decision process, wherein the socio-technical decision process comprises:

simulating a human decision process using a behavior model and a goal model for each of a plurality of agents to select an agent solution from the plurality of solutions for each agent;

simulating a system decision process using a sequential error search method for each of a plurality of systems to select a system solution from the plurality of solutions for each system; and generating the socio-technical decision using the selected agent solutions and the selected system solutions, wherein the socio-technical decision corresponds to the selected solution; and performing one or more actions to implement the socio-technical decision.

Clause 32. The airline operation control center of clause 31, wherein performing the socio-technical decision process comprises:

determining an agent cost solution from the plurality of solutions for each of the plurality of agents using an agent cost function associated with each agent;

determining a system cost solution from the plurality of solutions for each of the plurality of systems using a system cost function associated with each system;

selecting a resultant cost solution for each agent by applying an agent selection function associated with a particular agent to the agent cost solution for the particular agent and the system cost solution for the system associated with the particular agent;

consolidating the resultant cost solution for each agent to provide a plurality of resultant cost solutions; and selecting one of the resultant cost solutions by using a decision process to generate the socio-technical decision, wherein the socio-technical decision avoids or decreases the adverse effect caused by the event.

Clause 33. The airline operation control center of and of clauses 31 or 32, wherein using the decision process comprises one of:

using a collaborative majority decision process for selecting one of the resultant cost solutions in response to some of the resultant cost solutions being a same solution; and using the agent selection function of a predetermined agent of the plurality of agents for selecting one of the resultant cost solutions in response to all of the best cost solutions being different.

Clause 34. The airline operation control center of any of clauses 31-32 or 33, further comprising determining a particular agent cost function associated with each agent, wherein determining the particular agent cost function comprises using an affective agent model associated with a particular agent of the plurality of agents, a cost for each solution, and a probability of success for each solution.

Clause 35. The airline operation control center of any of clauses 31-33 or 34, wherein the affective agent model comprises a five-factor model of personality, and wherein five factors of personality of the five-factor model comprise openness, conscientiousness, extraversion, agreeableness, and neuroticism.

Clause 36. The airline operation control center of any of clauses 31-34 or 35, wherein the affective agent model associated with each agent comprises one or more functional goals and one or more quality goals and wherein the cost of a particular solution is determined for an amount of effort or a number of steps to perform the particular solution, and a probability of success of the particular solution is determined in satisfying at least one of the one or more functional goals and/or the one or more quality goals of a particular agent.

Clause 37. The airline operation control center of any of clauses 31-35 or 36, wherein determining the agent cost solution for each agent comprises using operational data obtained from a previous event, wherein the operational data comprises at least one of cost data or probability of success data for at least one of the plurality of solutions.

Clause 38. The airline operation control center of any of clauses 31-36 or 37, further comprising using a computational search process and a cost associated with each solution to determine the system cost solution for each system.

Clause 39. The airline operation control center of any of clauses 31-37 or 38, wherein using the system cost function comprises:

determining a cost (C) for each solution for a particular system;

determining a probability (P) for each solution being selected by the particular system; and performing the sequential error search method to determine the system cost solution for the particular system.

Clause 40. The airline operation control center of any of clauses 31-38 or 39, further comprising:

calculating a quotient of the probability divided by the cost (P/C) for each solution; and rank ordering the quotients in descending order, wherein the solution with a lowest remaining cost corresponds to the system cost solution for the particular system.

Clause 41. The airline operation control center of any of clauses 31-39 or 40, further comprising using operational data obtained from previous events, wherein the operational data comprises cost data and probability of success data for each of the plurality of solutions.

Clause 42. The airline operation control center of any of clauses 31-40 or 41, wherein the event comprises a disruption in operation of an aircraft causing an irregular operation associated with an airline operations control center.

Clause 43. The airline operation control center of any of clauses 31-41 or 42, further comprising determining the plurality of solutions to avoid or decrease the adverse effect, wherein the plurality of solutions comprises at least one of data associated with delaying a flight of the aircraft, rerouting the flight of the aircraft, canceling the flight of the aircraft, using another aircraft, using another crew, or booking passengers on another flight.

Clause 44. The airline operation control center of any of clauses 31-42 or 43, wherein the plurality of agents comprises at least one of an operations control agent, a passenger control agent, a ground control agent, a flight dispatch agent, a crew control agent, or a maintenance control agent.

Clause 45. The airline operation control center of any of clauses 31-43 or 44, wherein the plurality of systems comprises at least one of a movement control system, a flight planning system, a flight following system, a load planning system, a maintenance control system, a crew management system, or a passenger reservations system.

The flowchart and block diagrams in the Figures illustrate the architecture, functionality, and operation of possible implementations of systems, methods, and computer program products according to various examples of the subject disclosure. In this regard, each block in the flowchart or block diagrams can represent a module, segment, or portion of instructions, which comprises one or more executable instructions for implementing the specified logical function (s). In some alternative implementations, the functions noted in the block can occur out of the order noted in the figures.

For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

What is claimed is:

1. A method for generating a socio-technical decision in response to an event that causes irregular operation, the method comprising:

receiving, by a processing circuit, a plurality of solutions from a group of systems comprising at least: a movement control system, a flight planning system, a flight following system, a load planning system, a maintenance control system, a crew management system, and a passenger reservations system, the plurality of solutions decreasing or avoiding an adverse effect caused by an event;

selecting, by the processing circuit, a selected solution from the plurality of solutions by performing a socio-technical decision process, wherein the socio-technical decision process comprises:

simulating, in the processing circuit using a behavior model and a goal model, a process for selecting, for each agent of a plurality of agents, respectively: an agent solution from the plurality of solutions, the plurality of agents comprising: an airline passenger control agent, an airline crew control agent, and an airline flight operations agent;

simulating, in the processing circuit using a sequential error search method, a system decision process for selecting, for each system in the group of systems, respectively, a system solution from the plurality of solutions;

determining a particular agent cost function associated with each agent, wherein determining the particular agent cost function comprises using an affective agent model associated with a particular agent of the plurality of agents, wherein the affective agent model comprises a personality model consisting of factors of: openness, conscientiousness, extraversion, agreeableness, and neuroticism;

determining, using the particular agent cost function associated with each agent, an agent cost solution for each agent solution;

determining, using a system, a computational search process, and a cost function associated with each system in the group of systems, a system cost solution for each system solution;

selecting a resultant cost solution for each agent by applying an agent selection function associated with the particular agent to the agent cost solution for the particular agent and the system cost solution for a system associated with the particular agent; and consolidating the resultant cost solution for each agent to provide a plurality of resultant cost solutions, the consolidating further comprising:

generating, in the processing circuit, the socio-technical decision using a selected agent solution and a selected system solution, wherein the socio-technical decision corresponds to the selected solution; and using the socio-technical decision, executing one of: cancelling, delaying, or rerouting a flight of an aircraft.

2. The method of claim 1, further comprising:

selecting one of the plurality of resultant cost solutions by using a decision process to generate the socio-technical decision, wherein the socio-technical decision avoids or decreases the adverse effect caused by the event.

3. The method of claim 2, further comprising one of:

using a collaborative majority decision process for selecting one of the resultant cost solutions in response to some of the resultant cost solutions being a same solution; or using the agent selection function associated with the particular agent for selecting one of the resultant cost solutions in response to all of the resultant cost solutions being different.

4. The method of claim 2, further comprising determining the particular agent cost function associated with each agent, wherein determining the particular agent cost function further comprises using a cost and a probability of success for each of:

canceling the flight;

delaying the flight; and rerouting the flight.

5. The method of claim 4, further comprising using the affective agent model for generating the socio-technical decision.

6. The method of claim 4, wherein the affective agent model is associated with a particular agent of the plurality of agents and comprises one or more functional goals and one or more quality goals, and wherein the cost of a particular solution is determined for an amount of effort or a number of steps to perform the particular solution, and a probability of success of the particular solution is determined in satisfying at least one of the one or more functional goals or the one or more quality goals of the particular agent.

7. The method of claim 2, wherein determining the agent cost solution comprises using operational data obtained from a previous event, wherein the operational data comprises at least one of cost data or probability of success data for at least one solution.

8. The method of claim 2, further comprising deciding, using the agreeableness factor of the personality model and the agent selection function, whether the agent cost solution or the system cost solution is trusted most.

9. The method of claim 2, further comprising:
- determining a cost (C) for each solution of the plurality of solutions for a particular system;
- determining a probability (P) for each solution of the plurality of solutions being selected by the particular system; and
- performing a sequential error search method to determine the system cost solution for the particular system.

10. The method of claim 9, further comprising:
- calculating a quotient of the probability divided by the cost (P/C) for each solution; and
- rank ordering the quotients in descending order, wherein the solution with a lowest remaining cost corresponds to the system cost solution for the particular system.

11. The method of claim 10, further comprising using operational data obtained from previous events, wherein the operational data comprises cost data and probability of success data for each solution.

12. The method of claim 2, wherein the event comprises a disruption in operation of an aircraft causing an irregular operation associated with an airline operations control center.

13. The method of claim 12, further comprising determining the plurality of solutions to avoid or decrease the adverse effect, wherein the plurality of solutions comprises at least one of data associated with delaying a flight of the aircraft, rerouting the flight of the aircraft, canceling the flight of the aircraft, using another aircraft, using another crew, or booking passengers on another flight.

14. The method of claim 12, wherein the plurality of agents further comprises at least one of: a ground control agent, a flight dispatch agent, or a maintenance control agent.

15. A system configured to control operations of an airline, wherein the system comprises:
- a processing circuit; and
- a memory associated with the processing circuit, wherein the memory comprises computer-readable program instructions configured to, when executed by the processing circuit, cause the processing circuit to perform a set of functions that generate a socio-technical decision in response to an event that causes an irregular operation, and comprise:
- receiving solution data indicative of a plurality of solutions from a group of systems that comprise at least: a movement control system, a flight planning system, a flight following system, a load planning system, a maintenance control system, a crew management system, and a passenger reservations system, wherein the plurality of solutions avoid or decrease an adverse effect caused by an event;
- selecting a selected solution from the plurality of solutions by performing a socio-technical decision process, wherein the socio-technical decision process comprises:
  - simulating, using a behavior model and a goal model, a human decision process for selecting, for each agent of a plurality of agents, respectively, an agent solution from the plurality of solutions, wherein the plurality of agents comprises: an airline passenger control agent, an airline crew control agent, and an airline flight operations agent;
  - simulating, using a sequential error search method, a system decision process for selecting, for each system in the group of systems, respectively, a system solution from the plurality of solutions;
  - determining a particular agent cost function associated with each agent, wherein determining the particular agent cost function comprises using an affective agent model associated with a particular agent of the plurality of agents, wherein the affective agent model comprises a personality model consisting of factors of: openness, conscientiousness, extraversion, agreeableness, and neuroticism;
  - determining, using the particular agent cost function associated with each agent, an agent cost solution for each agent solution;
  - determining, using a system, a computational search process, and a cost function associated with each system in the group of systems, a system cost solution for each system solution;
  - selecting a resultant cost solution for each agent by applying an agent selection function associated with the particular agent to the agent cost solution for the particular agent and the system cost solution for a system associated with the particular agent; and
  - consolidating the resultant cost solution for each agent to provide a plurality of resultant cost solutions, the consolidating further comprising:
    - generating the socio-technical decision using selected agent solutions and selected system solutions, wherein the socio-technical decision corresponds to the selected solution; and
- using the socio-technical decision, executing one of: cancelling, delaying, or rerouting a flight of an aircraft.

16. The system of claim 15, wherein the set of functions further comprise selecting one of the resultant cost solutions by using a decision process to generate the socio-technical decision, wherein the socio-technical decision avoids or decreases the adverse effect caused by the event.

17. The system of claim 16, wherein using the decision process comprises one of:
- using a collaborative majority decision process for selecting one of the resultant cost solutions in response to some of the resultant cost solutions being a same solution; and
- using the agent selection function, wherein the agent selection function uses the agreeableness factor of the personality model associated with the particular agent, for selecting whether the agent cost solution or the system cost solution is trusted most.

18. An airline operations control center, that comprises:
- a system configured to generate a socio-technical decision in response to an event that causes an irregular operation in the airline operations control center, wherein the system comprises:
- a processing circuit; and
- a memory associated with the processing circuit, the memory comprising computer-readable program instructions configured to, when executed by the processing circuit, cause the processing circuit to perform a set of functions that comprise:
  - receiving a plurality of solutions from a group of systems comprising at least: a movement control system, a flight planning system, a flight following system, a load planning system, a maintenance control system, a crew management system, and a passenger reservations system, wherein the plurality of solutions avoid or decrease an adverse effect caused by the event;

selecting a selected solution from the plurality of solutions by performing a socio-technical decision process, wherein the socio-technical decision process comprises:

simulating, using a behavior model and a goal model, a human decision process for selecting, for each agent of a plurality of agents, respectively, an agent solution from the plurality of solutions, wherein the plurality of agents comprises: an airline passenger control agent, an airline crew control agent, and an airline flight operations agent;

simulating, using a sequential error search method, a system decision process for selecting, for each system in the group of systems, respectively, a system solution from the plurality of solutions;

determining a particular agent cost function associated with each agent, wherein determining the particular agent cost function comprises using an affective agent model associated with a particular agent of the plurality of agents, wherein the affective agent model comprises a personality model consisting of factors of: openness, conscientiousness, extraversion, agreeableness, and neuroticism;

determining, using the particular agent cost function associated with each agent, an agent cost solution for each agent solution;

determining, using a system, a computational search process, and a cost function associated with each system in the group of systems, a system cost solution for each system solution;

selecting a resultant cost solution for each agent by applying an agent selection function associated with the particular agent to the agent cost solution for the particular agent and the system cost solution for a system associated with the particular agent; and consolidating the resultant cost solution for each agent to provide a plurality of resultant cost solutions, the consolidating further comprising:

generating the socio-technical decision using selected agent solutions and selected system solutions, wherein the socio-technical decision corresponds to the selected solution; and based upon the socio-technical decision, executes one of: a cancelation, a delay, or a reroute, of a flight of an aircraft.

19. The airline operation control center of claim 18, wherein the set of functions further comprise selecting one of the resultant cost solutions by using a decision process to generate the socio-technical decision, wherein the socio-technical decision avoids or decreases the adverse effect caused by the event.

* * * * *